United States Patent
McGrew, Jr. et al.

(10) Patent No.: US 12,240,307 B2
(45) Date of Patent: *Mar. 4, 2025

(54) MOTOR CONFIGURATIONS FOR MULTIPLE MOTOR MIXED-SPEED CONTINUOUS POWER TRANSMISSION

(71) Applicant: Allison Transmission, Inc., Indianapolis, IN (US)

(72) Inventors: Arthur L. McGrew, Jr., Indianapolis, IN (US); Isaac Mock, Martinsville, IN (US); George S. Pelton, Indianapolis, IN (US); James Allen Raszkowski, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/510,009

(22) Filed: Nov. 15, 2023

(65) Prior Publication Data

US 2024/0075797 A1    Mar. 7, 2024

Related U.S. Application Data

(60) Division of application No. 17/661,948, filed on May 4, 2022, now Pat. No. 11,840,134, which is a
(Continued)

(51) Int. Cl.
*B60K 1/02* (2006.01)
*B60K 17/02* (2006.01)
(Continued)

(52) U.S. Cl.
CPC ............... *B60K 1/02* (2013.01); *B60K 17/02* (2013.01); *B60K 17/06* (2013.01); *F16H 3/64* (2013.01);
(Continued)

(58) Field of Classification Search
CPC ..... B60K 1/02; B60K 6/48; B60K 2006/4808; B60K 6/365; B60K 6/383;
(Continued)

(56) References Cited

U.S. PATENT DOCUMENTS

| | | |
|---|---|---|
| 4,368,810 A | 1/1983 | Maucher et al. |
| 4,449,416 A | 5/1984 | Huitema |
| 5,289,890 A | 3/1994 | Toyoda et al. |
| 5,598,910 A | 2/1997 | Moroto et al. |
| 5,904,631 A | 5/1999 | Morisawa et al. |

(Continued)

FOREIGN PATENT DOCUMENTS

| | | |
|---|---|---|
| CN | 106347112 A | 1/2017 |
| CN | 107160994 A | 9/2017 |

(Continued)

OTHER PUBLICATIONS

PCT, International Application No. PCT/US2020/070941 International Search Report, 4 pages, Apr. 8, 2021.

(Continued)

*Primary Examiner* — Ernesto A Suarez
*Assistant Examiner* — Lillian T Nguyen
(74) *Attorney, Agent, or Firm* — Woodard, Emhardt, Henry, Reeves & Wagner, LLP

(57) ABSTRACT

An electric powertrain includes a first electric motor that has an uninterrupted connection with a drive shaft of a vehicle. The electric powertrain further includes a second electric motor that has an interruptible connection with the drive shaft. In one form, this interruptible connection includes a clutch. The electric powertrain further includes a first gear train in the form of a first planetary gear and a second gear train in the form of a second planetary gear. In one form, the first electric motor and second electric motor are the same type of electric motor, and in another form, the first electric motor and second electric motor are different types of electric motors.

9 Claims, 10 Drawing Sheets

Related U.S. Application Data continuation of application No. PCT/US2020/070941, filed on Dec. 21, 2020, and a division of application No. 15/929,195, filed on Dec. 20, 2019, now Pat. No. 11,331,991, said application No. PCT/US2020/070941 is a continuation of application No. 15/929,195, filed on Dec. 20, 2019, now Pat. No. 11,331,991.

(51) Int. Cl.
  *B60K 17/06* (2006.01)
  *F16H 3/64* (2006.01)
  *F16H 3/44* (2006.01)

(52) U.S. Cl.
  CPC .............. *F16H 2003/447* (2013.01); *F16H 2200/2007* (2013.01); *F16H 2200/2033* (2013.01); *F16H 2200/2064* (2013.01); *F16H 2200/2082* (2013.01); *F16H 2200/2094* (2013.01); *F16H 2200/2097* (2013.01)

(58) Field of Classification Search
  CPC ....... B60K 2001/001; F16H 3/727–728; F16H 2200/2033; F16H 2200/2007–2017; F16H 2200/2094
  See application file for complete search history.

(56) References Cited

U.S. PATENT DOCUMENTS

| | | | |
|---|---|---|---|
| 5,931,757 | A | 8/1999 | Schmidt |
| 6,524,215 | B1 | 2/2003 | Schmidt |
| 6,793,600 | B2 | 9/2004 | Hiraiwa |
| 7,139,654 | B2 | 11/2006 | Fidlin et al. |
| 7,325,291 | B2 | 2/2008 | Ahnert |
| 7,935,015 | B2 | 5/2011 | Tabata et al. |
| 8,135,526 | B2 | 3/2012 | Minarcin et al. |
| 8,196,687 | B2 | 6/2012 | Swales et al. |
| 8,311,694 | B2 | 11/2012 | Imai et al. |
| 8,443,954 | B2 | 5/2013 | Quehenberger et al. |
| 8,454,473 | B2 | 6/2013 | Reitz |
| 8,465,386 | B2 | 6/2013 | Kersting |
| 8,465,387 | B2 | 6/2013 | Conlon |
| 8,647,237 | B2 | 2/2014 | Prix et al. |
| 9,120,480 | B2 | 9/2015 | Kiuchi |
| 9,168,911 | B2 | 10/2015 | Hayashi et al. |
| 9,381,800 | B2 | 7/2016 | Sakai et al. |
| 9,421,856 | B2 | 8/2016 | Frank et al. |
| 9,457,658 | B2 | 10/2016 | Knoblauch |
| 9,463,698 | B2 | 10/2016 | Severinsky et al. |
| 9,566,852 | B2 | 2/2017 | Knoblauch et al. |
| 9,566,857 | B1 | 2/2017 | Pritchard et al. |
| 9,573,585 | B2 | 2/2017 | Severinsky et al. |
| 9,944,279 | B2 | 4/2018 | Hata et al. |
| 10,093,165 | B2* | 10/2018 | Imamura ............... B60K 6/387 |
| 10,144,309 | B2 | 12/2018 | Leng et al. |
| 10,183,570 | B2 | 1/2019 | Kimes et al. |
| 10,220,725 | B2 | 3/2019 | Rush et al. |
| 10,220,726 | B2 | 3/2019 | Zing et al. |
| 10,421,350 | B2 | 9/2019 | Morrow et al. |
| 11,040,607 | B2 | 6/2021 | McGrew et al. |
| 11,173,781 | B2 | 11/2021 | Mock et al. |
| 11,193,562 | B1 | 12/2021 | McGrew, Jr. et al. |
| 11,840,134 | B2* | 12/2023 | McGrew, Jr. ......... B60K 17/02 |
| 2002/0078787 | A1 | 6/2002 | Comfort et al. |
| 2004/0058769 | A1 | 3/2004 | Larkin |
| 2004/0138801 | A1 | 7/2004 | Yasui et al. |
| 2005/0003929 | A1 | 1/2005 | Fidlin et al. |
| 2006/0154771 | A1 | 7/2006 | Klemen et al. |
| 2007/0049440 | A1 | 3/2007 | Raghavan et al. |
| 2007/0072725 | A1 | 3/2007 | Bucknor et al. |
| 2007/0093341 | A1 | 4/2007 | Supina et al. |
| 2007/0105678 | A1 | 5/2007 | Bucknor et al. |
| 2007/0270262 | A1 | 11/2007 | Raghavan et al. |
| 2008/0182693 | A1 | 7/2008 | Holmes |
| 2008/0234097 | A1 | 9/2008 | Sah |
| 2009/0029824 | A1 | 1/2009 | Tabata et al. |
| 2009/0084653 | A1 | 4/2009 | Holmes |
| 2009/0159349 | A1 | 6/2009 | Ebuchi et al. |
| 2010/0048338 | A1 | 2/2010 | Si |
| 2010/0089685 | A1 | 4/2010 | Quehenberger et al. |
| 2010/0179009 | A1* | 7/2010 | Wittkopp ............... B60K 6/547 475/5 |
| 2010/0227722 | A1 | 9/2010 | Conlon |
| 2010/0282530 | A1 | 11/2010 | Wang et al. |
| 2010/0326751 | A1 | 12/2010 | Markl |
| 2011/0015021 | A1* | 1/2011 | Maguire ............... B60K 6/445 475/8 |
| 2011/0070992 | A1 | 3/2011 | Si |
| 2011/0183801 | A1* | 7/2011 | Ando ................... B60K 6/445 475/5 |
| 2011/0251747 | A1 | 10/2011 | Imai et al. |
| 2012/0018274 | A1 | 1/2012 | Prix et al. |
| 2013/0095970 | A1 | 4/2013 | Conlon et al. |
| 2013/0338861 | A1 | 12/2013 | Hessell et al. |
| 2015/0040720 | A1 | 2/2015 | Kitabatake et al. |
| 2015/0229162 | A1 | 8/2015 | Gottfried |
| 2016/0047439 | A1 | 2/2016 | Kimes et al. |
| 2016/0082823 | A1 | 3/2016 | Park et al. |
| 2016/0230850 | A1 | 8/2016 | Kanada et al. |
| 2016/0325730 | A1 | 11/2016 | Ono et al. |
| 2016/0369873 | A1* | 12/2016 | Chae ..................... B60K 6/00 |
| 2017/0182995 | A1 | 6/2017 | Endo et al. |
| 2017/0182997 | A1 | 6/2017 | Hata et al. |
| 2017/0313182 | A1 | 11/2017 | Isono et al. |
| 2017/0327107 | A1 | 11/2017 | Ando et al. |
| 2018/0229596 | A1* | 8/2018 | Bird ..................... B60K 6/365 |
| 2018/0259012 | A1 | 9/2018 | Shibata et al. |
| 2018/0290534 | A1 | 10/2018 | Pan et al. |
| 2019/0077255 | A1 | 3/2019 | Misu et al. |
| 2019/0077259 | A1 | 3/2019 | Singh et al. |
| 2019/0078666 | A1 | 3/2019 | Duhaime et al. |
| 2019/0152311 | A1 | 5/2019 | Eo et al. |
| 2019/0184805 | A1* | 6/2019 | Aoki .................... B60K 6/445 |
| 2019/0190349 | A1 | 6/2019 | Ito et al. |
| 2020/0062101 | A1 | 2/2020 | Choi et al. |
| 2021/0008968 | A1 | 1/2021 | McGrew et al. |
| 2021/0188066 | A1 | 6/2021 | McGrew et al. |
| 2021/0188075 | A1 | 6/2021 | Mock et al. |
| 2021/0341036 | A1 | 11/2021 | McGrew et al. |
| 2021/0372506 | A1 | 12/2021 | McGrew, Jr. et al. |

FOREIGN PATENT DOCUMENTS

| | | |
|---|---|---|
| CN | 107244234 A | 10/2017 |
| CN | 108528188 A | 9/2018 |
| CN | 108944411 A | 12/2018 |
| CN | 108944412 A | 12/2018 |
| DE | 10235257 A1 | 2/2003 |
| DE | 102013005719 B3 | 8/2014 |
| DE | 102013005721 B4 | 10/2014 |
| EP | 2449286 B1 | 3/2013 |
| EP | 2762747 B1 | 8/2014 |
| EP | 3750733 A1 | 12/2020 |
| FR | 2834322 A1 | 7/2003 |
| JP | H11332018 A | 11/1999 |
| JP | 2007270865 A | 10/2007 |
| KR | 1020190057981 A | 5/2019 |
| KR | 20080027638 A | 2/2020 |
| WO | 2007118082 A2 | 10/2007 |
| WO | 2008029720 A1 | 3/2008 |
| WO | 2013094005 A1 | 6/2013 |
| WO | 2015104626 A1 | 7/2015 |
| WO | 2018084766 A1 | 5/2018 |
| WO | 2018224742 A1 | 12/2018 |

OTHER PUBLICATIONS

PCT, International Application No. PCT/US2020/070941 Written Opinion, 10 pages, Apr. 8, 2021.

(56) References Cited

OTHER PUBLICATIONS

GB, GB Application No. 2400833.6 Search and Examination Report, Mar. 1, 2024.

* cited by examiner

MOTOR CONFIGURATIONS FOR MULTIPLE MOTOR MIXED-SPEED CONTINUOUS POWER TRANSMISSION

CROSS REFERENCE TO RELATED APPLICATIONS

This application is a divisional of U.S. patent application Ser. No. 17/661,948, filed May 4, 2022, which is hereby incorporated by reference. U.S. patent application Ser. No. 17/661,948, filed May 4, 2022, is a continuation of International Patent Application Number PCT/US2020/070941, filed Dec. 21, 2020, which are hereby incorporated by reference. U.S. patent application Ser. No. 17/661,948, filed May 4, 2022, is a divisional of U.S. patent application Ser. No. 15/929,195, filed Dec. 20, 2019, which are hereby incorporated by reference. International Patent Application Number PCT/US2020/070941, filed Dec. 21, 2020, is a continuation of U.S. patent application Ser. No. 15/929,195, filed Dec. 20, 2019, which are hereby incorporated by reference.

BACKGROUND

There has been a recent push to develop hybrid and fully electric consumer passenger vehicles. This in turn has created an explosion in the development of various electric motor designs. However, even with these enhancements, current electric motors in consumer vehicles are not generally able to produce enough torque for large commercial vehicles. To reach these torque values would require larger and heavier electric motors which would tend to increase energy consumption.

Thus, there is a need for improvement in this field.

SUMMARY

A multiple electric motor system provides power to an output such as a driveshaft of a vehicle. One of the electric motors ("A"), which will be referred to as the "first motor" for our purposes, is always connected to the output drive shaft in order to continuously provide power for propelling the vehicle. In other words, the first electric motor (A) has an uninterrupted connection with the output. The system further includes a second electric motor ("B") that intermittently applies torque to the output shaft. In one variation, this intermittent connection between the second electric motor (B) and the output includes at least one clutch. The clutch engages and disengages the second electric motor (B) with the output shaft. In other examples, the system can include three or more electric motors.

Various configurations of electric motors can be used in the system. These include the types of motors used, the combinations of types of motors, and the relative locations of the motors. These different motor combinations allow the system to be readily adapted to different vehicle use cases and environments. The motors in one variation are the same type of electric motor such that the motors are interchangeable with one another. The motors in other variations are different such that the motors are not interchangeable. In one example, both of the motors are high speed electric motors. In a low speed motor option, both of the motors are low speed electric motors. In still yet another variation, a combination of different types of motors is used, that is low and high speed motors. For instance, in a first low/high speed motor option, the first electric motor (A) is a high-speed motor, and the second motor (B) is a low-speed motor. In a second option, the first motor (A) is a low-speed motor, and the second electric motor (B) is a high-speed motor. As should be recognized, the torque and other properties of the motors can also differ.

Aspect 1 generally concerns a system that includes a first electric motor with an uninterrupted connection to an output and a second electric motor with an interruptible connection to the output.

Aspect 2 generally concerns the system of any previous aspect in which the first and second electric motors are the same interchangeable type.

Aspect 3 generally concerns the system of any previous aspect in which the first and second electric motors are high speed motors with a rated operating speed of at least 5,000 rpm.

Aspect 4 generally concerns the system of any previous aspect in which the first and second electric motors are low speed motors with a rated operating speed of less than 5,000 rpm.

Aspect 5 generally concerns the system of any previous aspect in which the first and second electric motors are different types.

Aspect 6 generally concerns the system of any previous aspect in which the first electric motor is a high speed motor and the second electric motor is a low speed motor.

Aspect 7 generally concerns the system of any previous aspect in which the first electric motor is a low speed motor and the second electric motor is a high speed motor.

Aspect 8 generally concerns the system of any previous aspect in which the first electric motor is located upstream relative to the second electric motor.

Aspect 9 generally concerns the system of any previous aspect in which the second electric motor is located upstream relative to the first electric motor.

Aspect 10 generally concerns the system of any previous aspect in which the first electric motor has a rated continuous torque that is greater than the second electric motor.

Aspect 11 generally concerns the system of any previous aspect in which the second electric motor has a rated continuous torque that is greater than the first electric motor.

Aspect 12 generally concerns the system of any previous aspect in which the first electric motor has a rated continuous power that is greater than the second electric motor.

Aspect 13 generally concerns the system of any previous aspect in which the second electric motor has a rated continuous power that is greater than the first electric motor.

Aspect 14 generally concerns the system of any previous aspect in which the interruptible connection includes a clutch configured to couple the second electric motor to the output.

Aspect 15 generally concerns the system of any previous aspect in which the interruptible connection includes a planetary gear configured to at least change an output speed of the second electric motor.

Aspect 16 generally concerns the system of any previous aspect in which the clutch includes a positive clutch.

Aspect 17 generally concerns the system of any previous aspect in which the clutch has an actuator and a Selectable One-Way Clutch (SOWC).

Aspect 18 generally concerns the system of any previous aspect in which the uninterrupted connection includes a planetary gear configured to at least change an output speed of the first electric motor.

Aspect 19 generally concerns a method of operating the system of any previous aspect.

Further forms, objects, features, aspects, benefits, advantages, and embodiments of the present invention will become apparent from a detailed description and drawings provided herewith.

DESCRIPTION OF THE SELECTED EMBODIMENTS

Figure 1:
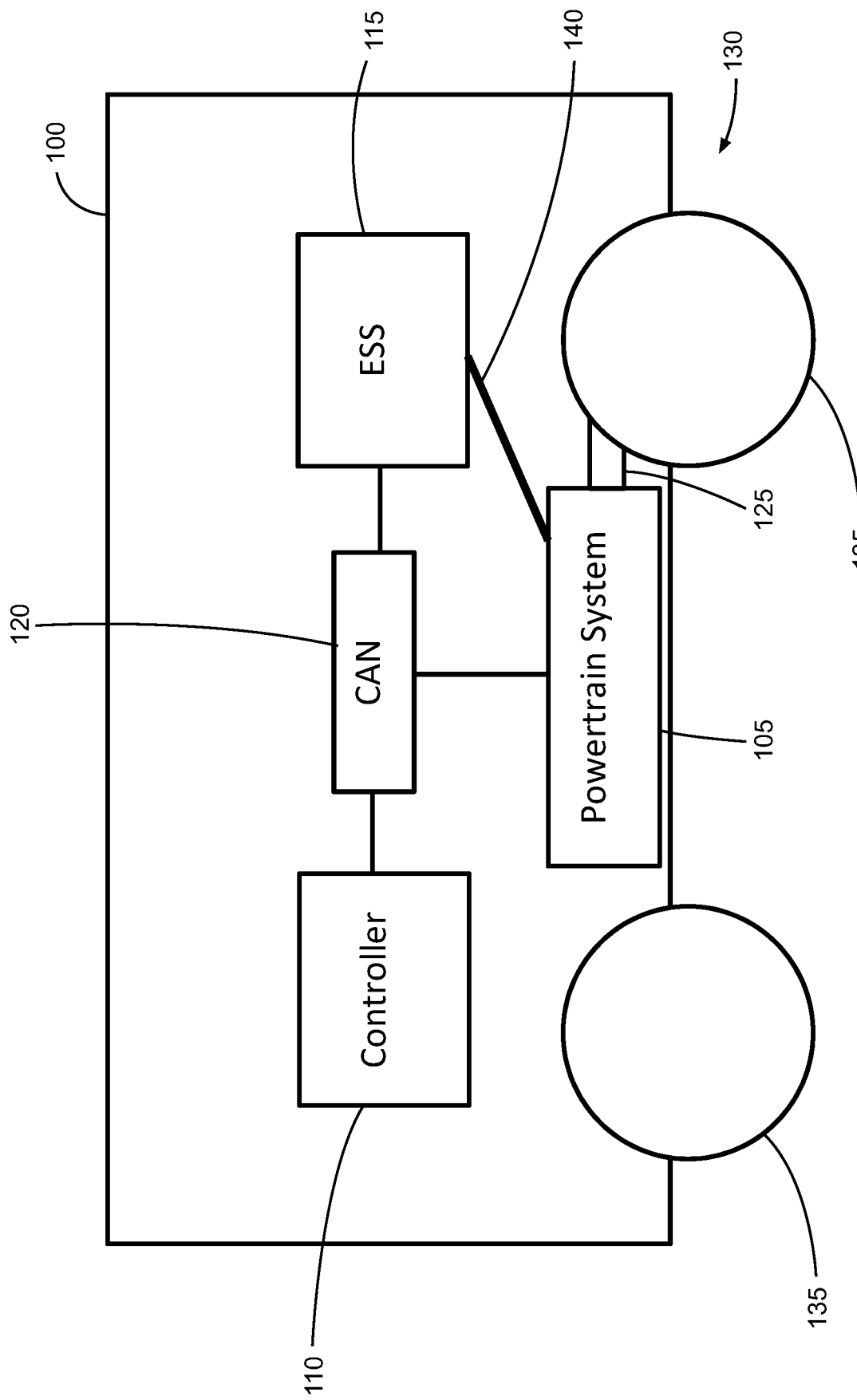
FIG. 1 is a diagrammatic view of a vehicle.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein, are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

A vehicle 100 according to one example is illustrated in FIG. 1. As shown, the vehicle 100 includes at least one powertrain system 105, at least one controller 110, and at least one Energy Storage System ("ESS") 115 configured to supply power to the powertrain system 105. The powertrain system 105, controller 110, and ESS 115 are operatively connected together so as to communicate with one another via at least one Controller Area Network ("CAN") 120. The controller 110 is configured to control the operation of one or more systems and/or other components of the vehicle 100 such as the powertrain system 105 and ESS 115. The powertrain system 105 has an output or drive shaft 125 that transfers mechanical power from the powertrain system 105 to a propulsion system 130. In the illustrated example, the propulsion system 130 includes one or more wheels 135, but the propulsion system 130 in further examples can include other types of propulsion devices like continuous track systems. One or more power cables 140 transfer electrical power between the powertrain system 105 and the ESS 115.

The powertrain system 105 is designed to electrically propel the vehicle 100 in an efficient manner. As will be explained in greater detail below, the powertrain system 105 is designed to power heavy-duty commercial and/or military grade vehicles such as buses, garbage trucks, delivery trucks, fire trucks, and semi-trailers. The powertrain system 105 is designed to electrically power vehicles 100 with a class group rating of at least four (4) according to the US Department of Transportation Federal Highway Administration (FHWA) classification rule set. In one form, the powertrain system 105 is configured to move at least 40,000 pound (18,144 Kg) passenger vehicles like buses. The powertrain system 105 has a unique, compact centerline design that allows the powertrain system 105 to be easily retrofitted into pre-existing vehicle chassis designs and/or conventional drivetrains with minimal changes to the other parts of the vehicle 100 like the braking and suspension systems. This in turn allows existing internal combustion type vehicles to be readily reconfigured as fully electric vehicles. Moreover, the centerline design of the powertrain system 105 reduces gear loss and other power losses so as to make the vehicle 100 more power efficient which in turn can improve driving range and/or reduce weight of other components such as the ESS 115.

Figure 2:
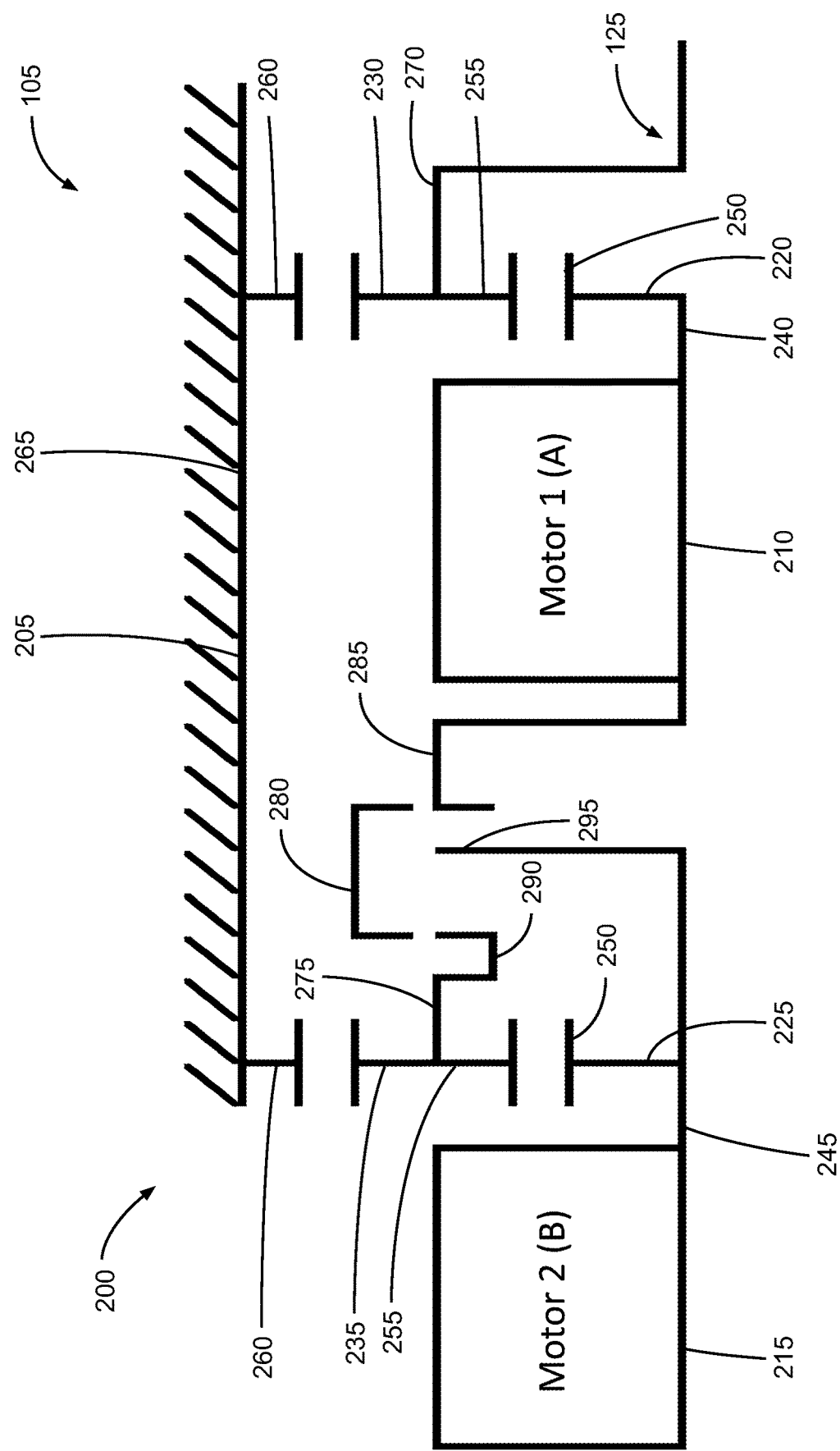
FIG. 2 is a diagrammatic view of one example of an electric powertrain that can be used in the vehicle of FIG. 1.

FIG. 2 shows a diagram of one example of an electric powertrain 200 that can be used in the powertrain system 105 of FIG. 1. As depicted, the electric powertrain 200 includes a multiple motor continuous power transmission 205. The transmission 205 of the electric powertrain 200 includes a first electric motor 210, which is referred to as "Motor A" occasionally, and a second electric motor 215 that is referred to as "Motor B" at times. In one example, the first electric motor 210 and second electric motor 215 are the same type of electric motor such that both motors generally provide the same speed and torque output within normal manufacturing tolerances. The first electric motor 210 and second electric motor 215 in one form are both high speed electric motors, and in another form, the first electric motor 210 and second electric motor 215 are both low speed electric motors. In alternative variations, the first electric motor 210 and second electric motor 215 can be different types (e.g., permanent magnet motors, induction motors, switched reluctance motors, etc.) and/or have different designs/configurations (e.g., pole counts, winding patterns, etc.).

The transmission 205 of the electric powertrain 200 further includes a first gear train 220 located at an output end of the first electric motor 210 and a second gear train 225 located at the output end of the second electric motor 215. As can be seen, the first gear train 220 is located at the output end of the entire transmission 205 that is proximal to the drive shaft 125. The second gear train 225 is sandwiched or located between the first electric motor 210 and the second electric motor 215. This configuration allows the electric powertrain 200 to have a compact design. In the illustrated example, the first gear train 220 is in the form of a first planetary gear 230, and the second gear train 225 is in the form of a second planetary gear 235. The first electric motor 210 and second electric motor 215 respectively have a first output shaft 240 and a second output shaft 245 for providing rotational mechanical power. As illustrated in FIG. 2, the first planetary gear 230 and second planetary gear 235 each has a sun gear 250, one or more planet gears 255 meshed with the sun gear 250, and a ring gear 260 that surrounds and meshes with the planet gears 255. The sun gear 250 of the first planetary gear 230 is secured to the first output shaft 240 of the first electric motor 210, and the sun gear 250 of the second planetary gear 235 is secured to the second output shaft 245 of the second electric motor 215. Both ring gears 260 of the first planetary gear 230 and the second planetary gear 235 are secured to a housing 265 of the electric powertrain 200. The planet gears 255 of the first planetary gear 230 are carried by a first carrier 270. The first carrier 270 is configured to connect with the drive shaft 125 so as to transfer mechanical power from the transmission 205 to the propulsion system 130. The planet gears 255 of the second planetary gear 235 are carried by a second carrier 275.

As shown in FIG. 2, the electric powertrain 200 includes at least one clutch 280 that engages and disengages the second electric motor 215 from the first electric motor 210. Through the clutch 280, the transmission 205 of the electric powertrain 200 is further able to shift gears such that the speed and torque from second electric motor 215 can be changed. The first electric motor 210 is permanently connected to the drive shaft 125 (i.e., there is no clutch) such that the first electric motor 210 is able to provide continuous power to the drive shaft 125 and propulsion system 130. In other words, the first electric motor 210 has an uninterrupted connection to the drive shaft 125, and the second electric motor 215 has an interruptible connection to the drive shaft 125. This configuration of the electric powertrain 200 facilitates power shifting in which power is always able to be provided to the wheels 135 even when shifting of the clutch 280 occurs. With power being continuously provided, any shifting can be made generally imperceptible to the driver and/or passengers. Moreover, acceleration performance of the vehicle 100 is enhanced, and the vehicle 100 is better able to maintain speed at higher grades.

In the illustrated example, the electric powertrain 200 includes a single clutch 280, but the electric powertrain 200 in other examples can include more than one clutch. In one variation, the clutch 280 is a dog clutch (e.g., 3-way dog clutch), and in another, the clutch 280 includes a dog clutch (e.g., 2-way dog clutch) along with a Selectable One-Way Clutch (SOWC). In further variations, the clutch 280 includes a wet disc type clutch or a dry disc type clutch. The first output shaft 240 for the first electric motor 210 has a clutch engagement member 285 where the clutch 280 is able to selectively engage different range members on the second output shaft 245 and the second carrier 275. The second carrier 275 of the second planetary gear 235 has a first range member 290 where the clutch 280 engages when in a first range position. When in the first range position, the clutch 280 connects the first range member 290 to the clutch engagement member 285 such that the speed (i.e., rpm) provided by the second electric motor 215 is reduced through the second gear train 225, and the torque provided by the second electric motor 215 to the first output shaft 240 is increased through the planet gears 255 of the second planetary gear 235. The second output shaft 245 of the second electric motor 215 has a second range member 295 where the clutch 280 engages when in a second range position. When in the second range position, the clutch 280 connects the second range member 295 to the clutch engagement member 285 such that the speed and torque of the second electric motor 215 is directly provided to the first output shaft 240 of the first electric motor 210. As compared to the first range position, the speed of the second electric motor 215 provided to the first output shaft 240 of the first electric motor 210 is faster, and the torque is less.

The clutch 280 can further be positioned at a neutral position where the second electric motor 215 is not mechanically coupled to the first electric motor 210. In the neutral or shift position, the first electric motor 210 can provide the sole mechanical power to propel the vehicle 100. Among other things, this ability to propel the vehicle 100 solely via the first electric motor 210 while the second electric motor 215 is disconnected from the first output shaft 240 allows the second electric motor 215 to synchronize speed with the first electric motor 210 in order to engage the clutch 280 (e.g., when the clutch 280 is a dog clutch) without power interruption to the vehicle 100. This also allows the first electric motor 210 to operate at a more efficient point than when sharing the output load with the second electric motor 215.

By using more than one electric motor, the powertrain system 105 is configured to allow smaller, consumer automotive electric motors to be used to power larger, commercial-grade vehicles such as those with a FHWA class rating of four (4) or higher. For instance, consumer automotive electric motors can be used to move vehicles 100 weighing 40,000 pounds (18,144 Kg) or more. Typically, but not always, consumer-grade automotive electric motors are less expensive, lighter, and are capable of providing higher speeds as compared to the higher torque commercial-grade electric motors. Moreover, these consumer-grade motors tend to be more power dense and energy efficient such that the coverage range of the vehicle 100 between charging of the ESS 115 can be enlarged.

Due to high demand and high production volumes, improvements in electric motor technology tends to occur more rapidly in the consumer space such that it is expected that these benefits of consumer automotive electric motors over lower demand commercial-grade electric vehicle motors will become more pronounced in the future. However, there are still drawbacks to using these consumer-grade electric motors for heavy commercial vehicles. Individual consumer-grade electric vehicle motors tend to produce insufficient torque to properly move and/or accelerate heavy duty vehicles such as buses and semi-trucks. There is also a trend to have the consumer-grade electric motors operate at even higher speed or rotations per minute (rpms) which are not desirable for heavy duty commercial-grade vehicles which tend to operate at lower speeds and require higher torques.

To facilitate the use of these consumer electric vehicle motors in heavy duty commercial applications, the powertrain system 105 includes at least two electric motors (e.g., the first electric motor 210 and second electric motor 215) so as to provide sufficient torque and power to the drive shaft 125 and the propulsion system 130. The powertrain system 105 further includes at least the first gear train 220 so as to reduce the speed and increase the torque provided by the first electric motor 210 and/or second electric motor 215. As shown, the powertrain system 105 can include additional gear trains, such as the second gear train 225, to enhance the performance of the powertrain system 105.

This multiple motor design also can use energy more efficiently. The power, speed, and/or torque provided by the first electric motor 210 and the second electric motor 215 can be adjusted so that the motors operate in a more efficient manner for differing operational conditions. For example, the clutch 280 can change the gear ratios of the second gear train 225 so as to adjust the output speed and/or torque provided by the second electric motor 215. The clutch 280 can further be used to disconnect the second electric motor 215 from the first electric motor 210 such that the first electric motor 210 provides all of the propulsive mechanical power to the drive shaft 125. At the same time, the second electric motor 215 can be shut down to conserve power and allow the first electric motor 210 to operate within an efficient power band, or the speed of the second electric motor 215 can be changed for shifting purposes. Once more, with the first electric motor 210 permanently connected to the drive shaft 125, power can be always applied to the propulsion system 130 such that any shifting of the second gear train 225 via the clutch 280 can be imperceptible to the driver and/or passengers of the vehicle 100. Given the first electric motor 210 continuously provides power to the wheels 135, the powertrain system 105 can take the proper time during shifting so as to enhance efficiency and performance of the vehicle 100. The powertrain system 105 is able to provide more than adequate time to deal with timing and synchronization issues between the first electric motor 210, second electric motor 215, second gear train 225, and/or clutch 280. By providing additional time for shifting without interrupting power, better synchronization can occur before clutch engagement which in turn prolongs the life of the clutch 280.

This unique two-motor architecture further enhances energy efficiency. For example, the controller 110 can set the torque of the first electric motor 210 to zero (0) such that the second electric motor 215 solely propels the vehicle 100. For instance, this can occur at low vehicle speeds where the speed of the first electric motor 210 would be too slow for the first electric motor 210 to operate in a highly efficient region, and at other times, the torque and speed profiles can depend on the types and designs of the two motors.

In one example, the first electric motor 210 and second electric motor 215 are the same type of electric motor such that both motors generally provide the same speed and torque output profiles within normal manufacturing tolerances. For example, the first electric motor 210 and second electric motor 215 in one version are made by the same manufacturer under the same part number and/or Stock Keeping Unit (SKU) such that the first electric motor 210 and second electric motor 215 are interchangeable parts. The first electric motor 210 and second electric motor 215 in one variation are high speed electric motors, and in one particular form, the first electric motor 210 and second electric motor 215 each have a peak speed of at least 10,600 rpm.

In other examples, the first electric motor 210 and second electric motor 215 are not the same type such that the first electric motor 210 and second electric motor 215 are not interchangeable parts. For instance, one of the motors is a high speed motor and the other is a low speed motor. The first electric motor 210 and second electric motor 215 in certain variations can further have different windings counts, winding patterns, winding wire gauges, winding wire cross-sectional shapes, stator configurations, and/or rotor configurations, to name just a few examples. Using different types of electric motors in the electric powertrain 200 can facilitate optimal or near optimal energy efficiency and/or power profiles for particular use cases of the vehicle 100.

Figure 3:
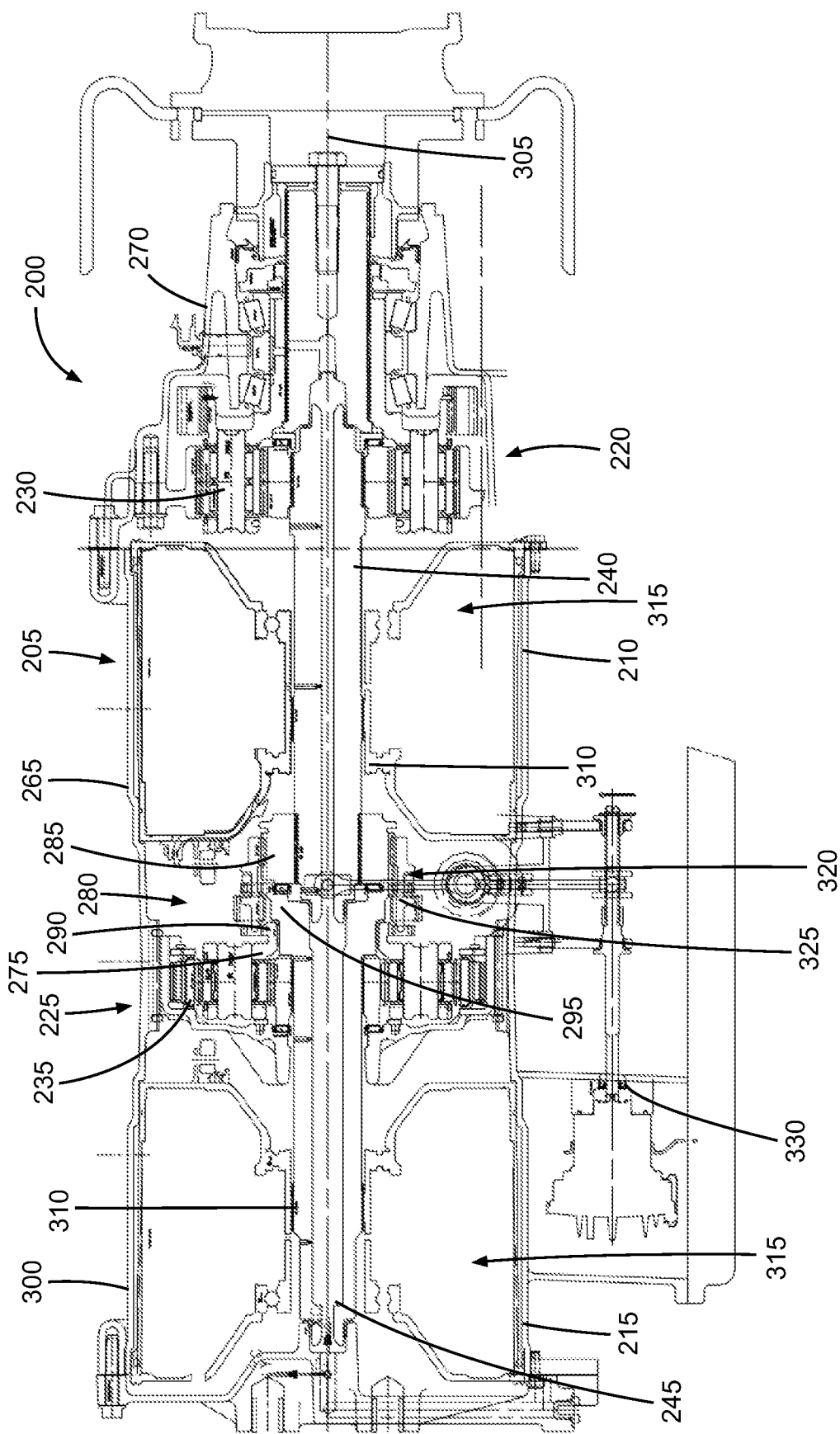
FIG. 3 is a cross-sectional view of one example of the electric powertrain of FIG. 2.

One example of the transmission 205 in the electric powertrain 200 is illustrated in FIG. 3. As can be seen, the electric powertrain 200 in this example includes an electric motor transmission 300 that is constructed in a similar fashion to the transmission 205 shown in FIG. 2. For example, the electric motor transmission 300 includes the first electric motor 210, second electric motor 215, first gear train 220, and second gear train 225 of the type described before. The first gear train 220 is in the form of the first planetary gear 230, and the second gear train 225 is in the form of the second planetary gear 235. The first planetary gear 230 is mounted to the first output shaft 240, and the second planetary gear 235 is mounted to the second output shaft 245. The first output shaft 240 and second output shaft 245 as well as the rest of the components of the electric motor transmission 300 rotate about and are oriented along a longitudinal axis 305 so as to give the electric motor transmission 300 a centerline orientation. The centerline orientation allows for the 1:1 ratio to be more efficient than a layshaft architecture with the motors on parallel which requires a gear mesh to provide power back to the output centerline. There is no such gear mesh loss for the 1:1 ratio in the illustrated centerline orientation. These power loss differentials are further magnified due to losses not only during propulsion but also during regenerative braking.

The components of the electric motor transmission 300 are housed inside the housing 265. As shown in FIG. 3, the first electric motor 210 and the second electric motor 215 each include a rotor 310 and a stator 315. The rotor 310 of the first electric motor 210 is secured to the first output shaft 240, and the rotor 310 of the second electric motor 215 is secured to the second output shaft 245. The stators 315 are in turn secured to the housing 265. The rotors 310 are configured to rotate relative to the fixed stators 315. When rotating, the rotor 310 of the first electric motor 210 rotates the first output shaft 240 which in turn powers the first planetary gear 230. The first planetary gear 230 reduces the output speed of the first electric motor 210 and/or second electric motor 215 that is supplied to the drive shaft 125 via the first carrier 270. Again, this speed reduction by the first gear train 220 can facilitate the use of higher speed consumer vehicle electric motors in heavy commercial-grade vehicles.

The rotor 310 of the stator 315 rotates the second output shaft 245 which in turn powers the second planetary gear 235. Again, the second planetary gear 235 has the second carrier 275 that is configured to transfer mechanical power to the first output shaft 240 via the clutch 280. The clutch 280 in FIG. 3 is a positive clutch 320 in the form of a dog clutch 325. The dog clutch 325 is actuated or moved by a clutch actuator 330. The clutch actuator 330 is operatively connected to and controlled by the controller 110 over the CAN 120. In one form, the clutch actuator 330 includes an electric motor or solenoid with linkages that actuate the clutch 280 so as to engage or disengage from the first range member 290 or second range member 295. The controller 110 is further operatively connected to the first electric motor 210 and second electric motor 215 to control the speed, torque, and/or relative positions of the first electric motor 210 and second electric motor 215.

With the positive clutch 320 using an interface type connection, the dog clutch 325 dramatically reduces power loss caused by slippage which is commonly present in friction type clutches such as wet and dry disc clutches. Wet and dry clutches further typically require high hydraulic pressures. On the other hand, dog clutches normally just require low lubrication pressures. Thus, the dog clutch 325 lowers the pressure requirements for the hydraulic system in the electric motor transmission 300. The overall design of the electric powertrain 200 facilitates the use of the dog clutch 325. With the first electric motor 210 able to provide continuous power to the drive shaft 125 when needed, the controller 110 can take the time to allow the second electric motor 215 to properly spin up or down to match the speed and relative position of the first range member 290 or second range member 295 with the clutch engagement member 285 of the first electric motor 210 so as to facilitate smooth engagement with minimal power loss.

As can be seen in FIG. 3, the second gear train 225 and clutch 280 are able to be received between the first electric motor 210 and second electric motor 215 so as to provide a compact configuration. Once more, this compact centerline configuration allows the electric motor transmission 300 to be readily retrofitted into preexisting vehicle designs with minimal redesign to major systems such as the suspension, braking, and steering systems. While only two motors are illustrated, the electric powertrain 200 can have more than two motors. For instance, this design is modular such that additional motors, gear trains, and/or clutches can be daisy-chained to the end of the second electric motor 215 so as to provide additional mechanical power.

One technique for operating the powertrain system 105 shown in FIGS. 1, 2, and 3 will be now described. This technique will be described with respect to actuating the dog clutch 325 in FIG. 3, but it should be recognized other types of clutches 280 can be controlled using this technique. Moreover, other types of powertrain systems 105 can be controlled in a similar fashion. With this technique, the controller 110 processes information from and sends control signals to the powertrain system 105 so as to control the operation of the first electric motor 210, second electric motor 215, and clutch 280.

Initially, the clutch 280 is positioned in a neutral/shifting position wherein the clutch 280 is not engaged with the first range member 290 and second range member 295. The controller 110 determines whether the clutch 280 needs to be shifted depending on a number of factors like the operational conditions of the vehicle 100 and powertrain system 105. The controller 110 can then shift the clutch 280 from the neutral position to the first range or shift position where the clutch 280 engages the first range member 290 to the clutch engagement member 285. At the first range position, both the first electric motor 210 and second electric motor 215 provide power to the drive shaft 125. As compared to the second range or shift position, the second electric motor 215 in the first range position provides greater torque at a lower speed to the clutch engagement member 285 of the first output shaft 240. The controller 110 can then shift the clutch 280 back to the neutral position to keep the clutch 280 at the neutral position so that no mechanical power is transferred by the second electric motor 215 or to subsequently shift the clutch 280 to the second range position. The controller 110 can then shift the clutch 280 from the first range position to the neutral position.

Depending on the operational needs and conditions of the vehicle 100, the controller 110 can shift the electric powertrain 200 to the second range position. When the controller 110 selects the second range position, the controller 110 shifts the clutch 280 from the neutral position to the second range position. At the second range position, the clutch 280 mechanically connects the second range member 295 to the clutch engagement member 285 of the first output shaft 240. While in the second range position, both the first electric motor 210 and second electric motor 215 provide power to the drive shaft 125. As compared to the first range position, the second electric motor 215 in the second range position provides lower torque at a higher speed to the clutch engagement member 285 of the first output shaft 240. The controller 110 shifts the clutch 280 back to the neutral position to keep the clutch 280 at the neutral position so that no mechanical power is transferred by the second electric motor 215 or to subsequently shift the clutch 280 to the first range position. The controller 110 shifts the clutch 280 from the second range position to the neutral position.

When in the neutral or shifting position, the sole mechanical power to the drive shaft 125 of the vehicle 100 can only be provided by the first electric motor 210 via the first planetary gear 230. Mechanical power can also be sent the opposite way from the wheels 135 of the propulsion system 130 to the first electric motor 210 for regenerative braking purposes where the first electric motor 210 acts as an electric generator to recharge the ESS 115. The first electric motor 210 when in this neutral position typically provides power to move the wheels 135. For example when coasting downhill, however, the first electric motor 210 can be shut off temporarily to conserve energy or again used as a generator for recharging the ESS 115.

When the clutch 280 is in the neutral position, the second electric motor 215 can likewise be shut off on a temporary (or semi-permanent) basis to conserve energy. The controller 110 moves the clutch 280 temporarily into the neutral position when shifting between the first and second range positions. When in this neutral position during shifting, the speed and relative orientation of the output from the second electric motor 215 (i.e., at the first range member 290 or second range member 295) is changed to generally correspond to the current speed and position of the first electric motor 210 when the positive clutch 320, such as the dog clutch 325, is used. Once the speed and position are generally matched, the clutch 280 can be shifted from the neutral position to the desired shift position or range. When the clutch 280 is a friction based clutch, such as a dry or wet disc clutch, the speeds and relative positions of the first electric motor 210 and second electric motor 215 do not need to be as closely matched as compared to the positive clutch 320.

When the dog clutch 325 is in the first range position, the dog clutch 325 connects the first range member 290 of the second carrier 275 to the clutch engagement member 285 of the first output shaft 240. Both the first electric motor 210 and the second electric motor 215 provide the mechanical power to the drive shaft 125 of the vehicle 100. Once more, the first planetary gear 230 reduces the rotational speed of the resulting output from both the first electric motor 210 and the second electric motor 215. This again allows consumer passenger motors, which tend to be high speed motors, to be used in heavy duty commercial vehicles. Once more, mechanical power can also be sent the opposite way from the wheels 135 of the propulsion system 130 to the first electric motor 210 and/or second electric motor 215 for regenerative braking purposes where the first electric motor 210 and/or second electric motor 215 act as electric generators to recharge the ESS 115.

The second electric motor 215 is able to supplement, or even replace, the torque provided by the first electric motor 210. When the clutch 280 is in the first range position, the second planetary gear 235 reduces the speed and increases the torque output from the second electric motor 215 via the planet gears 255. The speed of the first electric motor 210 and/or second electric motor 215 can be adjusted so that the dog clutch 325 is able to attain engagement. With the second electric motor 215 providing supplemental (or primary) mechanical power, the first electric motor 210 can be smaller than is required at peak load. This in turn allows high speed electric motors designed for consumer passenger vehicles to be used in larger commercial-grade vehicles. Moreover, the first electric motor 210 and second electric motor 215 can be selected based on the desired power and energy requirements for the vehicle 100. This in turn can increase the range of the vehicle 100 for a single charge of the ESS 115. Normally, both the first electric motor 210 and second electric motor 215 provide power to the drive shaft 125 when in the first range position. However, under certain use cases, one of the motors can be shut off to conserve power. For instance, the second electric motor 215 can be shut off so that the first electric motor 210 provides all of the power to the wheels 135. Alternatively, the first electric motor 210 can be shut off so that the second electric motor 215 provides all of the power to the wheels 135. This may help enhance efficiency under common conditions, such as low speed parking lot maneuvers.

In a similar fashion the second electric motor 215 is able to supplement the torque provided by the first electric motor 210 when in the second shift or range position. When in the second range position, the dog clutch 325 connects the second range member 295 of the second output shaft 245 to the clutch engagement member 285 of the first output shaft 240. Typically, but not always, the controller 110 selects the second range position when the vehicle 100 is travelling at higher speeds as compared to the first position range. Normally, both the first electric motor 210 and second electric motor 215 provide power to the drive shaft 125 when in the second range position. However, under certain use cases, one of the motors can be shut off to conserve power. For instance, the second electric motor 215 can be shut off so that the first electric motor 210 provides all of the power to the wheels 135. The first electric motor 210 can alternatively be shut off so that the second electric motor 215 provides all of the power to the wheels 135.

Both the first electric motor 210 and the second electric motor 215 provide the mechanical power to the drive shaft 125 of the vehicle 100. In this case, the mechanical output of the second electric motor 215 bypasses the second gear train 225. Once more, the first planetary gear 230 reduces the rotational speed of the resulting output from both the first electric motor 210 and the second electric motor 215. It should be again recognized that this configuration of the electric powertrain 200 allows consumer passenger motors, which tend to have high operational speeds, to be used in heavy duty commercial vehicles. Again, mechanical power can be also sent the opposite way from the wheels 135 of the propulsion system 130 to the first electric motor 210 and/or second electric motor 215 for regenerative braking purposes where the first electric motor 210 and/or second electric motor 215 act as electric generators to recharge the ESS 115.

Figure 4:
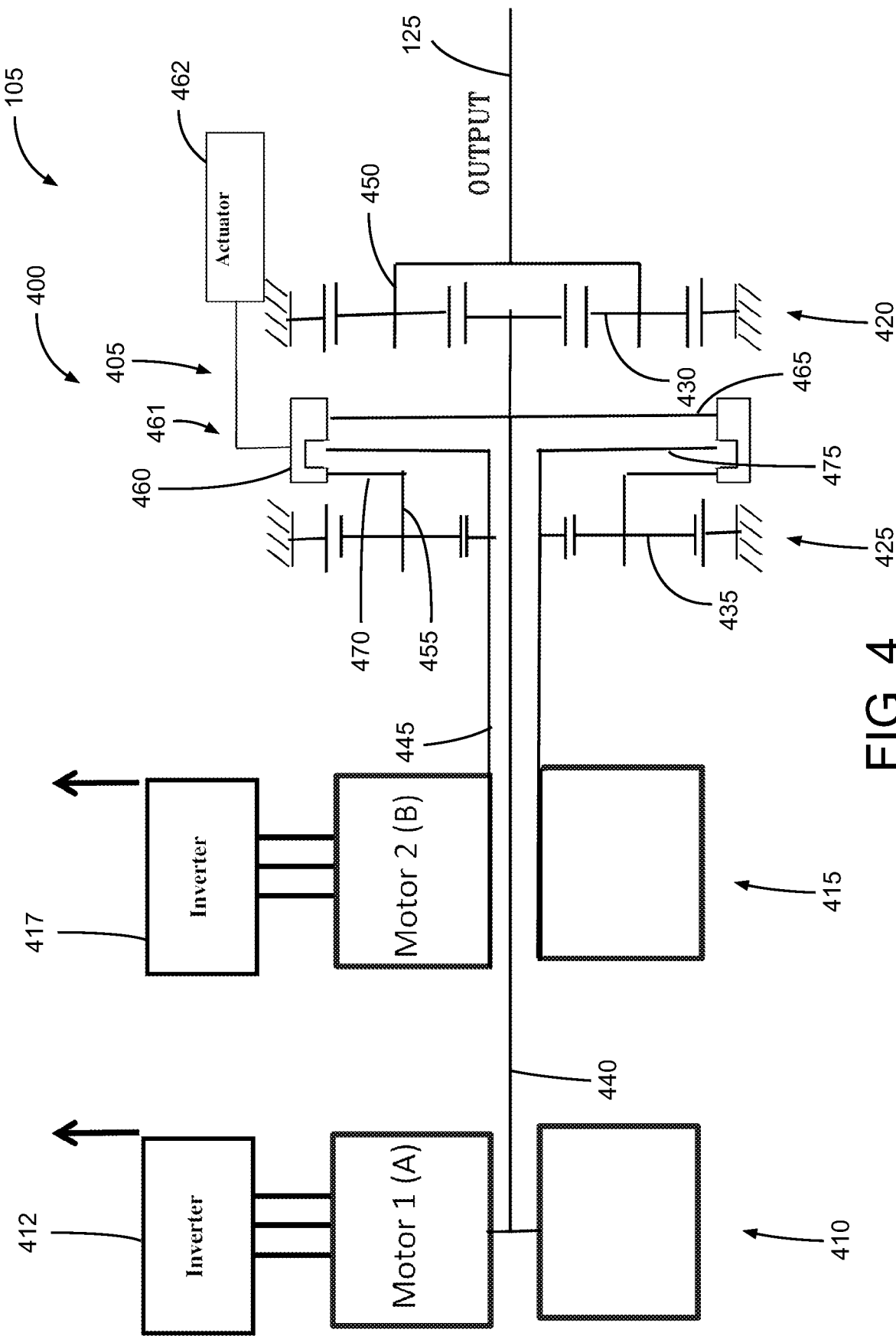
FIG. 4 is a diagrammatic view of another example of an electric powertrain that can be used in the vehicle of FIG. 1.
Figure 5:
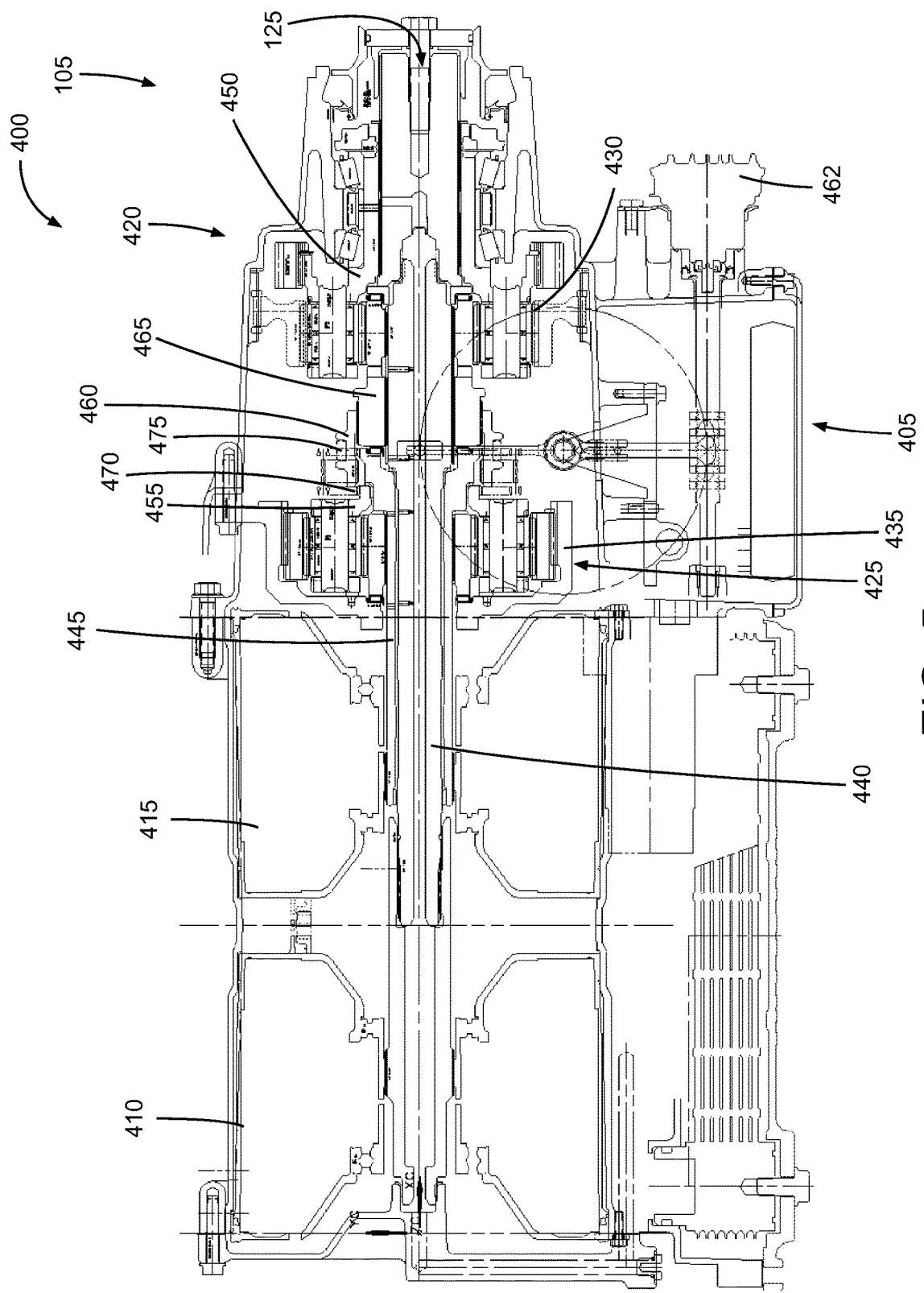
FIG. 5 is a cross-sectional view of the electric powertrain shown in FIG. 4.

FIG. 4 shows a diagram of another example of an electric powertrain 400 that can be used in the powertrain system 105 of FIG. 1. FIG. 5 shows a cross-sectional view of the electric powertrain 400. The electric powertrain 400 shares a number of components and functions in common with the ones described before (see e.g., FIGS. 2 and 3). For the sake of brevity as well as clarity, these common features will not be described in great detail below, but please refer to the previous discussion.

As depicted, the electric powertrain 400 includes a multiple motor continuous power transmission 405. The transmission 405 of the electric powertrain 400 includes a first electric motor 410 with a first inverter 412 and a second electric motor 415 with a second inverter 417. The first inverter 412 is electrically connected between the ESS 115 and the first electric motor 410, and the second inverter 417 is electrically connected between the ESS 115 and the second electric motor 415. The first inverter 412 and second inverter 417 convert the direct current (DC) from the ESS 115 to alternating current (AC) in order to power the first electric motor 410 and second electric motor 415, respectively. The first electric motor 410 and second electric motor 415 can also act as generators such as during regenerative braking. In such a situation, the first inverter 412 and second inverter 417 act as rectifiers by converting the AC electrical power from the first electric motor 410 and second electric motor 415, respectively, to DC power that is supplied to the ESS 115. In the illustrated example, the first inverter 412 and second inverter 417 include combined inverter-rectifiers that at least convert DC to AC and AC to DC. In one example, the first electric motor 410 and second electric motor 415 are the same type of electric motor such that both motors generally provide the same speed and torque output within normal manufacturing tolerances. In other words, the first electric motor 410 and second electric motor 415 are interchangeable with one another. The first electric motor 410 and second electric motor 415 in one form are both high speed electric motors, and in another form, the first electric motor 410 and second electric motor 415 are both low speed electric motors. In alternative variations, the first electric motor 410 and second electric motor 415 can be different such that one for example is a high speed motor and the other is a low speed motor.

The first electric motor 410 and second electric motor 415 in one form are interchangeable with one another. In one specific example, the first electric motor 410 and second electric motor 415 are the same type of high speed electric motor having rated speeds of at least 5,000 revolutions per minute (rpm), and more particularly, the first electric motor 410 and second electric motor 415 each has a rated speed of at least 10,600 rpm, a rated peak power of at least 250 horsepower (hp), a rated continuous power of at least 150 hp, a rated continuous torque of at least 240 pound-feet (lb-ft), and a rated peak torque of at least 310 lb-ft.

The transmission 405 of the electric powertrain 400 further includes a first gear train 420 and a second gear train 425 both located at an output end of the first electric motor 410 and the second electric motor 415. As can be seen, the first gear train 420 is located at the output end of the entire transmission 405 that is proximal to the drive shaft 125. The second gear train 425 is sandwiched or located between the second electric motor 415 and the first gear train 420. This configuration helps to dampen noise created by the second gear train 425. In the illustrated example, the first gear train 420 is in the form of a first planetary gear 430, and the second gear train 425 is in the form of a second planetary gear 435. The first electric motor 410 and second electric motor 415 respectively have a first output shaft 440 and a second output shaft 445 for providing rotational mechanical power. In the illustrated example, the second output shaft 445 is hollow such that the first output shaft 440 is able to extend through the second output shaft 445 in a concentric manner. Similar to the previous examples, the first planetary gear 430 has a first carrier 450 that is connected to the drive shaft 125, and the second planetary gear 435 has a second carrier 455.

As shown in FIGS. 4 and 5, the electric powertrain 400 includes at least one clutch 460 with a clutch actuator 462 that engages and disengages the second electric motor 415 from the first electric motor 410. Through the clutch 460, the transmission 405 of the electric powertrain 400 is further able to shift gears such that the speed and/or torque from second electric motor 415 can be changed. The first electric motor 410 is permanently connected to the drive shaft 125 (i.e., there is no clutch) such that the first electric motor 410 is able to provide continuous power to the drive shaft 125 and propulsion system 130. In other words, the first electric motor 410 has an uninterrupted connection to the drive shaft 125, and the second electric motor 415 has an interruptible connection to the drive shaft 125. This configuration of the electric powertrain 400 facilitates power shifting in which power is always able to be provided to the wheels 135 even when shifting of the clutch 460 occurs. With power being continuously provided, any shifting can be made generally imperceptible to the driver and/or passengers.

In the illustrated example, the electric powertrain 400 includes a single clutch 460, but the electric powertrain 400 in other examples can include more than one clutch. In one variation, the clutch 460 is a dog clutch 461, and in another, the clutch 460 is a Selectable One-Way Clutch (SOWC). In further variations, the clutch 460 includes a wet disc type clutch or a dry disc type clutch. As should be appreciated, replacing the dog clutch with a SOWC, a wet disk type clutch, and/or a dry disk type clutch requires the use of more than one clutch. For example, the dog clutch may be replaced by two wet or dry disk type clutches. The first output shaft 440 for the first electric motor 410 has a clutch engagement member 465 where the clutch 460 is able to engage the first output shaft 440. The second carrier 455 of the second planetary gear 435 has a first range member 470 where the clutch 460 engages when in a first range position. When in the first range position, the clutch 460 connects the first range member 470 to the clutch engagement member 465 such that the speed (i.e., rpm) provided by the second electric motor 415 is reduced through the second gear train 425, and the torque provided by the second electric motor 415 to the first output shaft 440 is increased through the second planetary gear 435. The second output shaft 445 of the second electric motor 415 has a second range member 475 where the clutch 460 engages when in a second range position. When in the second range position, the clutch 460 connects the second range member 475 to the clutch engagement member 465 such that the speed and torque of the second electric motor 415 is directly provided to the first output shaft 440 of the first electric motor 410. As compared to the first range position, the speed of the second electric motor 415 provided to the first output shaft 440 of the first electric motor 410 is faster, and the torque is less. The clutch 460 can further be positioned at a neutral position where the second electric motor 415 is not mechanically coupled to the first electric motor 410. In the neutral shift position, the first electric motor 410 can provide the sole mechanical power to propel the vehicle 100.

By using more than one electric motor, the powertrain system 105 is configured to allow smaller, consumer automotive electric motors to be used to power larger, commercial-grade vehicles such as those with a FHWA class rating of four (4) or higher and/or those that are able to move 40,000 pounds (18,144 Kg) or more. Typically, but not always, consumer-grade automotive electric motors are less expensive, lighter, and are capable of providing higher speeds as compared to the higher torque commercial-grade electric motors. Moreover, these consumer-grade motors tend to be more power dense and energy efficient such that the coverage range of the vehicle 100 between charging of the ESS 115 can be enlarged.

The electric powertrain 400 operates in a similar fashion as described before. Again, this multiple motor design also can use energy more efficiently. The power, speed, and/or torque provided by the first electric motor 410 and the second electric motor 415 can be adjusted so that the motors operate in a more efficient manner for differing operational conditions. For example, the clutch 460 can change the gear ratios of the second gear train 425 so as to adjust the output speed and/or torque provided by the second electric motor 415. The dog clutch 461 can further be used to disconnect the second electric motor 415 from the first electric motor 410 such that the first electric motor 410 provides all of the propulsive mechanical power to the drive shaft 125. At the same time, the second electric motor 415 can be shut down to conserve power and allow the first electric motor 410 to operate within an efficient power band, or the speed of the second electric motor 415 can be changed for shifting purposes. Having the first gear train 420 reduce the output speed, the first electric motor 410 and second electric motor 415 can be high speed motors that are commonly developed for passenger vehicles.

Once more, with the first electric motor 410 permanently connected to the drive shaft 125 power can be always applied to the propulsion system 130 such that any shifting of the second gear train 425 via the clutch 460 can be imperceptible to the driver and/or passengers of the vehicle 100. Given the first electric motor 410 continuously provides power to the wheels 135, the powertrain system 105 can take the proper time during shifting so as to enhance efficiency and performance of the vehicle 100. The powertrain system 105 is able to provide more than adequate time to deal with timing and synchronization issues between the first electric motor 410, second electric motor 415, second gear train 425, and/or clutch 460.

With the first electric motor 410 and second electric motor 415 being electric motors, there is no need for hydraulic controls because the electric powertrain 400 can be electronically controlled. The first electric motor 410 and second electric motor 415 again in one specific example are the same type of high speed electric motor having rated speeds of at least 5,000 rpm, and more particularly, the first electric motor 410 and second electric motor 415 each has a rated speed of at least 10,600 rpm, a rated peak power of at least sun gear 250 hp, a rated continuous power of at least 150 hp, a rated continuous torque of at least first output shaft 240 lb-ft, and a rated peak torque of at least rotor 310 lb-ft. The first planetary gear 430 of the first gear train 420 reduces the output speed from both the first electric motor 410 and second electric motor 415 such that the maximum output speed at the drive shaft 125 is about 3,500 rpm and the maximum output torque at the drive shaft 125 is about 3,600 lb-ft in one example.

Figure 6:
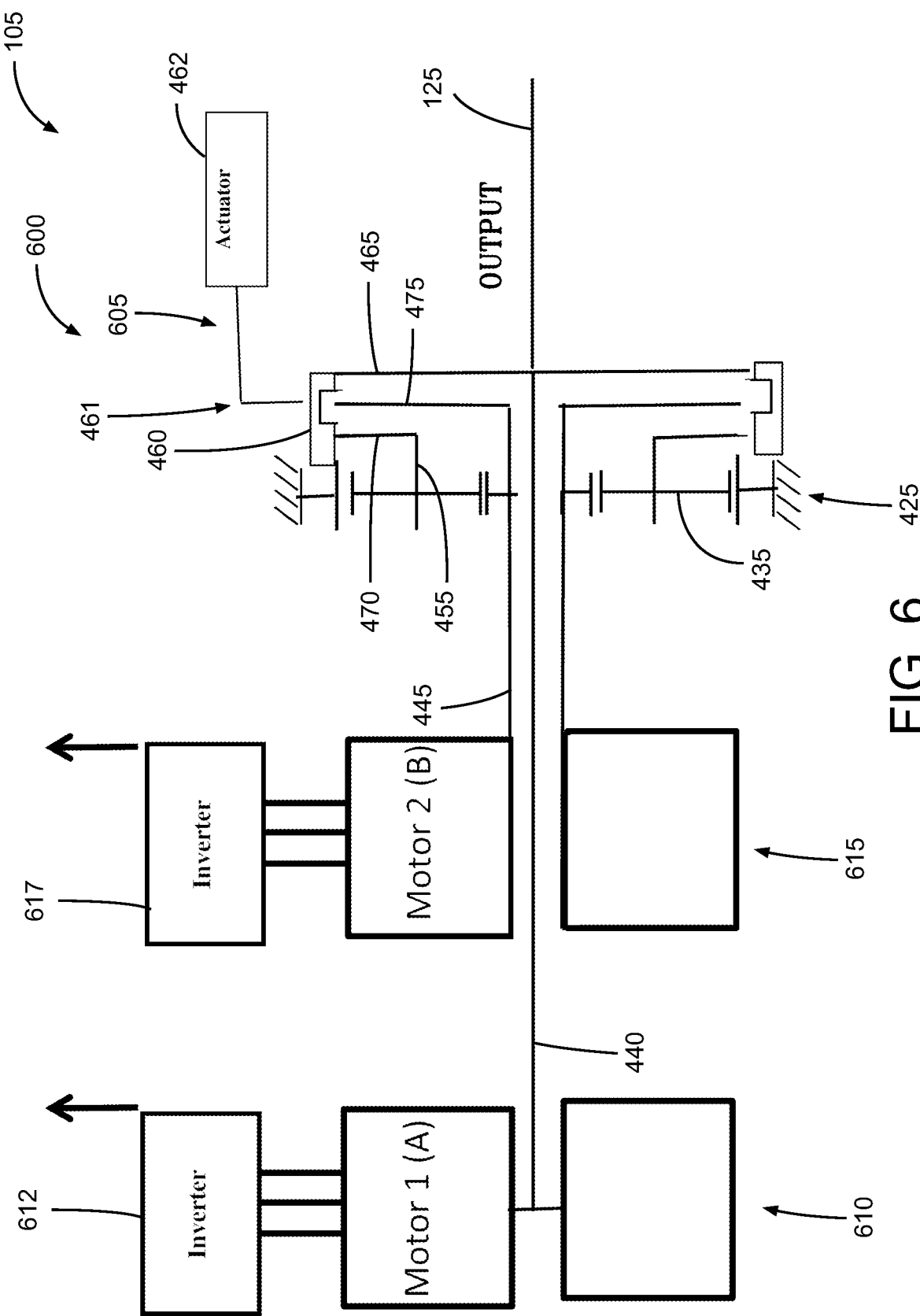
FIG. 6 is a diagrammatic view of a further example of an electric powertrain that can be used in the vehicle of FIG. 1.

FIG. 6 shows an electric powertrain 600 that is a variation of the electric powertrain 400 shown in FIG. 4. As can be seen, the electric powertrain 600 contains a number of the same components and is constructed in a similar manner as the electric powertrain 400 shown in FIG. 4. For example, the electric powertrain 600 includes the second gear train 425, second planetary gear 435, first output shaft 440, second output shaft 445, second carrier 455, clutch 460, and clutch actuator 462 of the type described above for the electric powertrain 400 in FIG. 4, and the electric powertrain 600 includes a first electric motor 610 with a first inverter 612 and a second electric motor 615 with a second inverter 617. Once more, the clutch 460 is a dog clutch 461 to reduce power loss during shifting. For the sake of brevity and clarity, these common features will not be again discussed below, so please refer to the previous discussion of these features. Unlike the electric powertrain 400 in FIG. 4, the electric powertrain 600 has a transmission 605 in which the first gear train 420 (i.e., first planetary gear 430) has been eliminated. In the illustrated example, both the first electric motor 610 and second electric motor 615 are low speed motors with a rated speed of less than 5,000 rpm. This configuration of the electric powertrain 600 is conducive in situations where the first electric motor 610 and second electric motor 615 are both low speed motors such that the first gear train 420 is not required to reduce the speed of the output from the electric powertrain 600.

With the first electric motor 610 and second electric motor 615 being electric motors, there is no need for hydraulic controls because the electric powertrain 600 can be electronically controlled. The first electric motor 610 and second electric motor 615 again in one specific example are the same type of low speed electric motor having rated speeds of less than 5,000 rpm. In one form, the first electric motor 610 and second electric motor 615 are interchangeable parts with the same part or SKU number. More particularly, the first electric motor 610 and second electric motor 615 each has a rated speed of at most 4,500 rpm, a rated peak power of at least 250 hp (600 Volts DC), a rated continuous power of at least 133 hp (600 Volts DC), a rated continuous torque of at least 320 lb-ft, and a rated peak torque of at least 735 lb-ft. Without the first gear train 420, the output at the drive shaft 125 from the electric powertrain 600 has a maximum output speed of about 3,500 rpm and a maximum output torque of about 3,200 lb-ft in one example.

The second gear train 425 and clutch 460 in the electric powertrain 600 operates in a similar fashion as described before. The controller 110 via the clutch actuator 462 shifts the dog clutch 461 between neutral, first range, and second range positions so that the second electric motor 615 is able to provide different torques (or not) to the clutch engagement member 465 that are combined with the torque from the first electric motor 610 at the drive shaft 125. When the dog clutch 461 is in a neutral position, the second electric motor 615 does not supply power to the drive shaft 125. In such a case, the first electric motor 610 can supply all of the power to the drive shaft 125. Once more, the first electric motor 610 can also act as a generator during regenerative braking so as to recharge the ESS 115. The dog clutch 461 engages the first range member 470 to place the clutch 460 in the first range position where the second electric motor 615 is able to provide higher torques to the drive shaft 125. The dog clutch 461 shifts to the second range position by engaging the second range member 475. At the second range position, the second electric motor 615 provides a torque that is lower than when at the first range position, but the speed is higher. Once again, both the first electric motor 610 and second electric motor 615 are low speed motors such that the first gear train 420 is not required to reduce the speed of the output from the electric powertrain 600.

Figure 7:
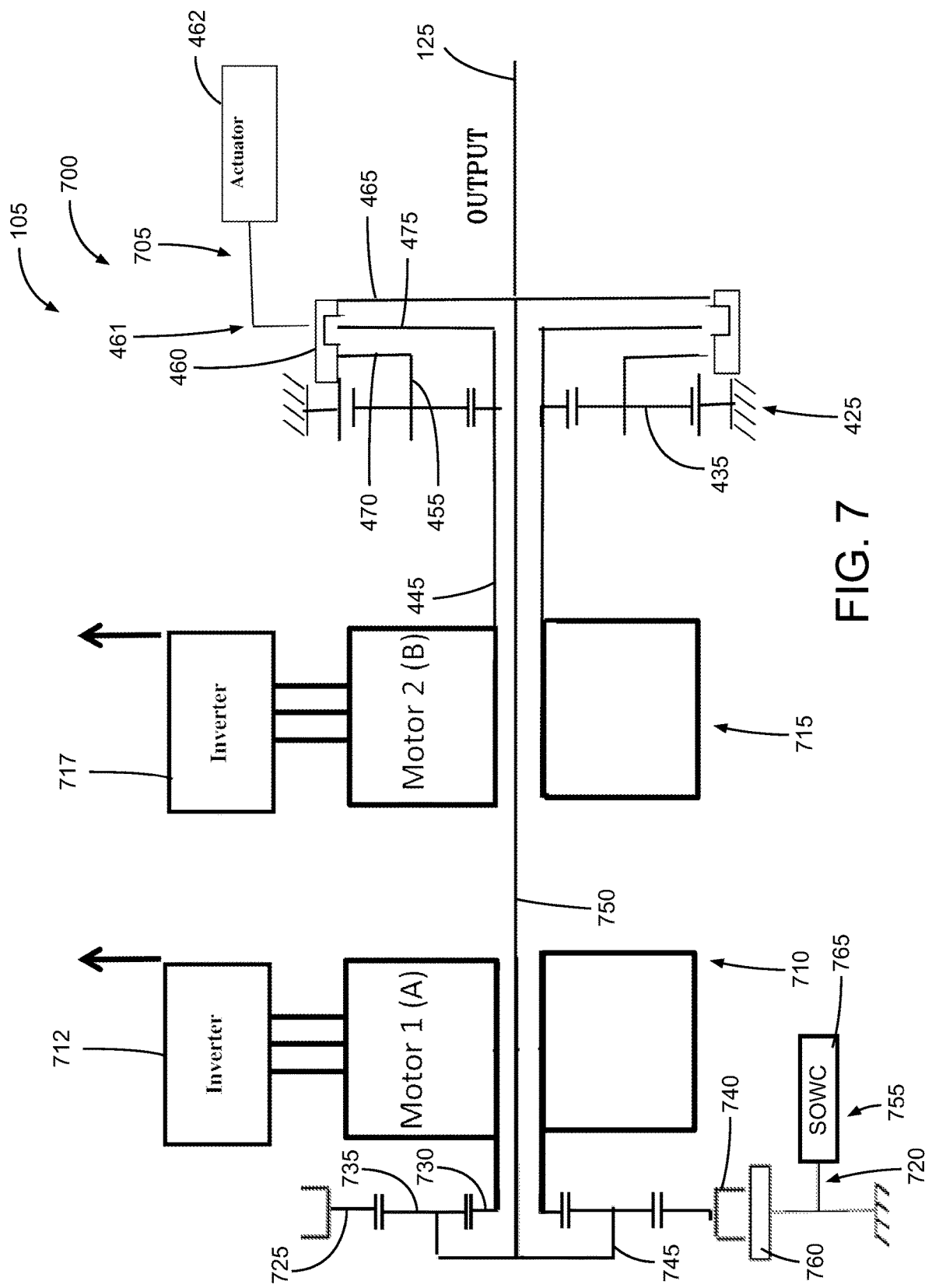
FIG. 7 is a diagrammatic view of another example of an electric powertrain that can be used in the vehicle of FIG. 1.

FIG. 7 shows an electric powertrain 700 that is a variation of the electric powertrain 400 shown in FIG. 4. As can be seen, the electric powertrain 700 contains a number of the same components and is constructed in a similar manner as the electric powertrain 400 shown in FIG. 4. For example, the electric powertrain 700 includes the second gear train 425, second planetary gear 435, second output shaft 445, second carrier 455, clutch 460, and clutch actuator 462 of the type described above for the electric powertrain 400 in FIG. 4 and the electric powertrain 600 in FIG. 6. For the sake of brevity and clarity, these common features will not be again discussed below, so please refer to the previous discussion of these features.

Like in the earlier examples, the electric powertrain 700 includes a first electric motor 710 with a first inverter 712 and a second electric motor 715 with a second inverter 717. In this illustrated example, the first electric motor 710 and second electric motor 715 are not the same type of motor such that the first electric motor 710 and second electric motor 715 are not interchangeable with one another. By using different types of motors, which can have different speed, torque, and/or power characteristics, the efficiency and power characteristics of the electric powertrain 700 can be enhanced. In other words, one of the motors can compensate for the deficiencies of the other under different operational demands. For instance, when the electric powertrain 700 is dealing with a load that requires high torques at low speeds, a low-speed, high-torque motor can provide most (if not all) of the power, and the corresponding high-speed, low-torque motor can provide less power. When the conditions reverse to a low torque, high speed situation, the workloads of the motors can reverse such that the high-speed, low-torque motor provides more (or all) of the power, and the low speed, high torque motor provides less power.

As shown, the first electric motor 710 is located upstream of the drive shaft 125 relative to the second electric motor 715. In the illustrated example, the first electric motor 710 is a high speed electric motor, and the second electric motor 715 is a low speed electric motor. In one version, the first electric motor 710 is a high speed electric motor having a rated operating speed of at least 5,000 rpm, and the second electric motor 715 is a low speed electric motor having a rated operating speed of less than 5,000 rpm. The first electric motor 710 in one version has a rated operating speed of at least 10,600 rpm, a rated peak power of at least 250 hp, a rated continuous power of at least 150 hp, a rated continuous torque of at least 240 lb-ft, and a rated peak torque of at least 310 lb-ft. In this version, the second electric motor 715 has a rated operating speed of at most 4,500 rpm, a rated peak power of at least 250 hp (600 Volts DC), a rated continuous power of at least 133 hp (600 Volts DC), a rated continuous torque of at least 320 lb-ft, and a rated peak torque of at least 735 lb-ft. The speed of the second electric motor 715 in one form is limited to a maximum speed of 3,500 rpm during operation.

The first inverter 712 and second inverter 717 DC from the ESS 115 to AC in order to power the first electric motor 710 and second electric motor 715, respectively. The first electric motor 710 and second electric motor 715 can also act as generators such as during regenerative braking. In such a situation, the first inverter 712 and second inverter 717 act as rectifiers by converting the AC electrical power from the first electric motor 710 and second electric motor 715, respectively, to DC power that is supplied to the ESS 115. In the illustrated example, the first inverter 712 and second inverter 717 include combined inverter-rectifiers that at least convert DC to AC and AC to DC.

As can be seen in FIG. 7, the transmission 705 further includes a first gear train 720. The first gear train 720 is located at the output end of the first electric motor 710 which is located on the end of the electric powertrain 700 that is opposite to the drive shaft 125. The first electric motor 710 and second electric motor 715 are sandwiched between the first gear train 720 and second gear train 425. The first gear train 720 includes a first planetary gear 725. As depicted, the first planetary gear 725 has a sun gear 730 that is attached to the first electric motor 710, one or more planet gears 735 engaged to orbit around the sun gear 730, and a ring gear 740 that surrounds the planet gears 735. The planet gears 735 engage both the sun gear 730 and ring gear 740. The planet gears 735 are secured to a first carrier 745.

The electric powertrain 700 further has a first output shaft 750 that connects the first carrier 745 of the first planetary gear 725 to the drive shaft 125. Proximal to the drive shaft 125, the clutch engagement member 465 extends radially from the first output shaft 750. As illustrated, the first output shaft 750 extends in a longitudinal direction through the first electric motor 710, second electric motor 715, and second output shaft 445. The first output shaft 750 extends in a concentric manner with the second output shaft 445. The first electric motor 710 and second electric motor 715 in one example are respectively secured to the first planetary gear 725 and second output shaft 445 via spline type connections of the types described and illustrated before. The first electric motor 710 can have an uninterrupted connection to the drive shaft 125 via the first planetary gear 725 and first output shaft 750, if so desired.

The transmission 705 further includes a Selectable One-Way Clutch ("SOWC") 755 that is able to engage and disengage the ring gear 740 such that ring gear 740 is able to be stationary or rotate. In the illustrated example, the SOWC 755 includes a clutch engagement member 760 configured to engage the ring gear 740 of the first planetary gear 725 and a clutch actuator 765 that selectively engages the clutch engagement member 760 with the ring gear 740 to provide torque from the first electric motor 710 to the first output shaft 750. The clutch actuator 765 is operatively coupled to the controller 110 so that the controller 110 is able to control the operation of the SOWC 755.

When the clutch actuator 765 of the SOWC 755 disengages the clutch engagement member 760 from the ring gear 740, the ring gear 740 is able to rotate or orbit around the sun gear 730 in the first planetary gear 725. With the ring gear 740 in this disengaged state in which the ring gear 740 is able to move, the first carrier 745 remains generally stationary even when the first electric motor 710 rotates or applies torque to the sun gear 730 of the first planetary gear 725. Consequently, torque is not transferred from the first electric motor 710 to the drive shaft 125. In another embodiment, when torque from the first electric motor 710 is not required, the first electric motor 710 can be shut down. This prevents the rotation of the first electric motor 710. As a result, no torque is provided to the drive shaft 125. On the other hand, when the controller 110 via the clutch actuator 765 engages the clutch engagement member 760 with the ring gear 740, relative movement of the ring gear 740 is prevented. Having the ring gear 740 fixed allows the first carrier 745 to rotate as the first electric motor 710 rotates the sun gear 730 which in turn allows torque to be transferred from the first electric motor 710 to the drive shaft 125 along the first output shaft 750. The first electric motor 710 is again a high speed motor. The first planetary gear 725 reduces the output speed of the first electric motor 710 such that the speed of the first output shaft 750 can generally match the speed of the lower speed, second electric motor 715, if needed.

The second gear train 425 and clutch 460 in the electric powertrain 700 operate in a similar fashion as described before. The controller 110 via the clutch actuator 462 shifts the dog clutch 461 between neutral, first range, and second range positions so that the second electric motor 715 is able to provide different torques (or not) to the clutch engagement member 465 that are combined with the torque from the first electric motor 710 at the drive shaft 125. When the dog clutch 461 is in a neutral position, the second electric motor 715 does not supply power to the drive shaft 125. In such a case, the first electric motor 710 can supply all of the power to the drive shaft 125, if required. Once more, the first electric motor 710 can also act as a generator during regenerative braking so as to recharge the ESS 115. The dog clutch 461 engages the first range member 470 to place the clutch 460 in the first range position where the second electric motor 715 is able to provide higher torques to the drive shaft 125. The dog clutch 461 shifts to the second range position by engaging the second range member 475. At the second range position, the second electric motor 715 provides a torque that is lower than when at the first range position, but the speed is higher. While the first electric motor 710 is a high speed motor, the output speed of the first electric motor 710 is reduced by the first planetary gear 725, and the second electric motor 715 is a low speed motor such that the first gear train 420 is not required to reduce the speed of the output from the electric powertrain 700. This configuration in turn allows the use of two different, or non-interchangeable motors, that have different power profiles such that the first electric motor 710 and second electric motor 715 cumulatively can operate more efficiently.

Figure 8:
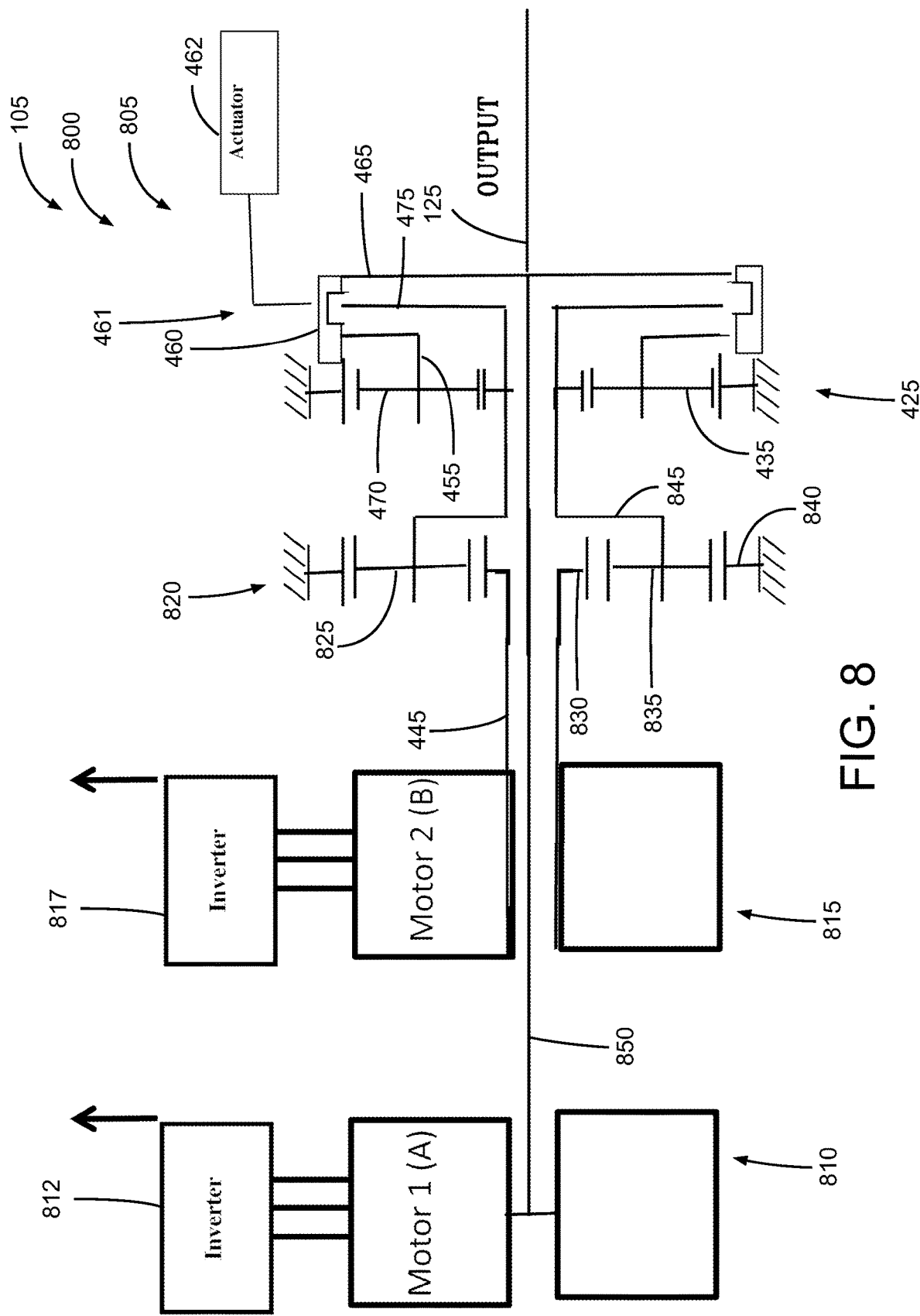
FIG. 8 is a diagrammatic view of still yet a further example of an electric powertrain that can be used in the vehicle of FIG. 1.

FIG. 8 shows another example of an electric powertrain 800 that includes two different types of motors. As can be seen, the electric powertrain 800 contains a number of the same components and is constructed in a similar manner as the electric powertrain 400 shown in FIG. 4, the electric powertrain 600 in FIG. 6, and the electric powertrain 700 in FIG. 7. For example, the electric powertrain 800 includes the second gear train 425, second planetary gear 435, first output shaft 440, second output shaft 445, second carrier 455, clutch 460, and clutch actuator 462 of the type described above. For the sake of brevity and clarity, these common features will not be again discussed below in great detail, so please refer to the previous discussion of these features.

Like in the earlier examples, the electric powertrain 800 includes a first electric motor 810 with a first inverter 812 and a second electric motor 815 with a second inverter 817. In this illustrated example, the first electric motor 810 and second electric motor 815 are not the same type of motor such that the first electric motor 810 and second electric motor 815 are not interchangeable with one another. By using different types of motors, which can have different speed, torque, and/or power characteristics, the efficiency and power characteristics of the electric powertrain 800 can be enhanced. In other words, one of the motors can compensate for the deficiencies of the other under different operational demands. For instance, when the electric powertrain 800 is dealing with a load that requires high torques at low speeds, a low-speed, high-torque motor can provide most (if not all) of the power, and the corresponding high-speed, low-torque motor can provide less power. When the conditions reverse to a low torque, high speed situation, the workloads of the motors can reverse such that the high-speed, low-torque motor provides more (or all) of the power, and the low speed, high torque motor provides less power.

As shown, the first electric motor 810 is located upstream of the drive shaft 125 relative to the second electric motor 815. As compared to the FIG. 7 electric powertrain 700, the relative positions of the low and high speed motors have been switched or swapped. In the illustrated example, the first electric motor 810 is a low speed electric motor, and the second electric motor 815 is a high speed electric motor. In one version, the first electric motor 810 has a rated operating speed of at most 4,500 rpm, a rated peak power of at least sun gear 250 hp (600 vdc), a rated continuous power of at least 133 hp (600 vdc), a rated continuous torque of at least 320 lb-ft, and a rated peak torque of at least 835 lb-ft. The speed of the first electric motor 810 in one form is limited to a maximum speed of 3,500 rpm during operation. In this version, the second electric motor 815 is a high speed electric motor having a rated operating speed of at least 5,000 rpm, and the second electric motor 815 is a low speed electric motor having a rated operating speed of less than 5,000 rpm. The second electric motor 815 in one version has a rated operating speed of at least 10,600 rpm, a rated peak power of at least 250 hp, a rated continuous power of at least 150 hp, a rated continuous torque of at least 240 lb-ft, and a rated peak torque of at least 310 lb-ft.

The first inverter 812 and second inverter 817 convert DC from the ESS 115 to AC in order to power the first electric motor 810 and second electric motor 815, respectively. The first electric motor 810 and second electric motor 815 can also act as generators such as during regenerative braking. In such a situation, the first inverter 812 and second inverter 817 act as rectifiers by converting the AC electrical power from the first electric motor 810 and second electric motor 815, respectively, to DC power that is supplied to the ESS 115. In the illustrated example, the first inverter 812 and second inverter 817 include combined inverter-rectifiers that at least convert DC to AC and AC to DC.

As can be seen in FIG. 8, the transmission 805 further includes a speed reduction gear train 820 that reduces the speed and increases the torque from the high speed, second electric motor 815. The speed reduction gear train 820 is located at the output end of the second electric motor 815. The speed reduction gear train 820 is sandwiched between the second electric motor 815 and the second gear train 425. The speed reduction gear train 820 includes a first planetary gear 825. As depicted, the first planetary gear 825 has a sun gear 830 that is attached to the second output shaft 445, one or more planet gears 835 engaged to orbit around the sun gear 830, and a ring gear 840 that surrounds the planet gears 835. The planet gears 835 engage both the sun gear 830 and ring gear 840. The planet gears 835 are secured to a carrier 845. The carrier 845 is connected to the input of the second planetary gear 435 and the second range member 475.

The electric powertrain 800 further has a first output shaft 850 that connects the first electric motor 810 to the drive shaft 125. Proximal to the drive shaft 125, the clutch engagement member 465 extends radially from the first output shaft 850. As illustrated, the first output shaft 850 extends in a longitudinal direction through the first electric motor 810, second electric motor 815, second output shaft 445, and second gear train 425. The first output shaft 850 extends in a concentric manner with respect to the second output shaft 445. The first electric motor 810 and second electric motor 815 in one example are respectively secured to the second output shaft 445 and first output shaft 850 via spline type connections. The first electric motor 810 has an uninterrupted connection to the drive shaft 125 via the first output shaft 850.

As noted before, the first electric motor 810 is a low speed electric motor, and the second electric motor 815 is a high speed electric motor. The speed reduction gear train 820 reduces the speed and increases the torque from the high speed, second electric motor 815. This power from the first planetary gear 825 is in turn suppled to the second gear train 425. Since the first electric motor 810 is a low speed electric motor, the speed of the first electric motor 810 does not need to be reduced by a planetary gear or other types of gearing. The first electric motor 810 via the first output shaft 850 has an uninterrupted connection with the drive shaft 125.

The second gear train 425 and clutch 460 in the electric powertrain 800 operate in a similar fashion as described before. The controller 110 via the clutch actuator 462 shifts the dog clutch 461 between neutral, first range, and second range positions so that the second electric motor 815 is able to provide different torques (or not) to the clutch engagement member 465 that are combined with the torque from the first electric motor 810 at the drive shaft 125. When the dog clutch 461 is in a neutral position, the second electric motor 815 does not supply power to the drive shaft 125. In such a case, the first electric motor 810 can supply all of the power to the drive shaft 125, if required. Once more, the first electric motor 810 can also act as a generator during regenerative braking so as to recharge the ESS 115. The dog clutch 461 engages the first range member 470 to place the clutch 460 in the first range position where the second electric motor 815 is able to provide even higher torques to the drive shaft 125 at lower speeds. The dog clutch 461 shifts to the second range position by engaging the second range member 475. At the second range position, the second electric motor 815 provides a torque that is lower than when at the first ranges position, but the speed is higher. While the second electric motor 815 is a high speed motor, the output speed of the second electric motor 815 is reduced by the first planetary gear 825, and the first electric motor 810 is a low speed motor such that the first gear train 420 is not required to reduce the speed of the output from the electric powertrain 800. This configuration in turn allows the use of two different, or non-interchangeable motors, that have different power profiles such that the first electric motor 810 and second electric motor 815 cumulatively can operate more efficiently.

Figure 9:
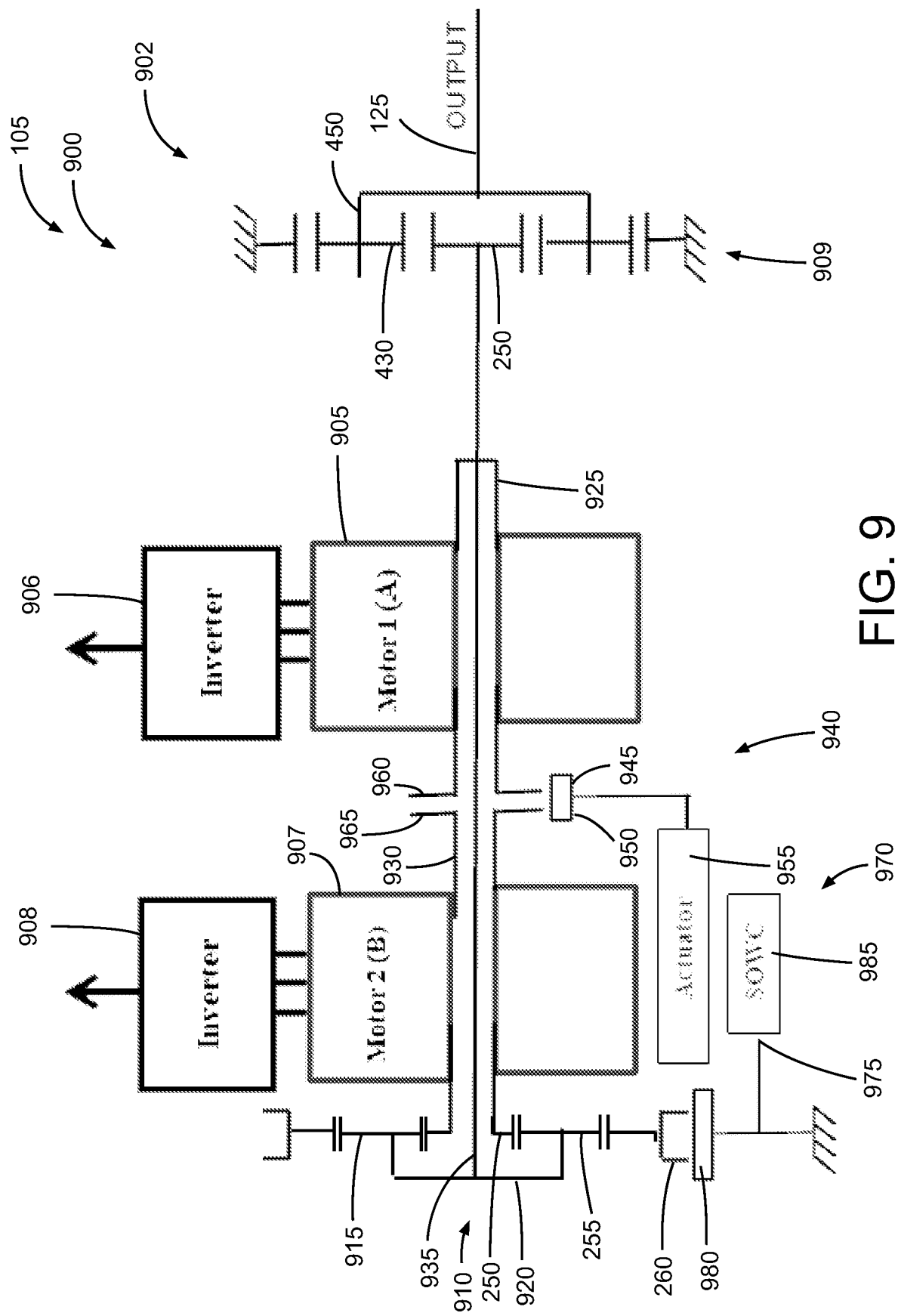
FIG. 9 is a diagrammatic view of yet another example of an electric powertrain that can be used in the vehicle of FIG. 1.
Figure 10:
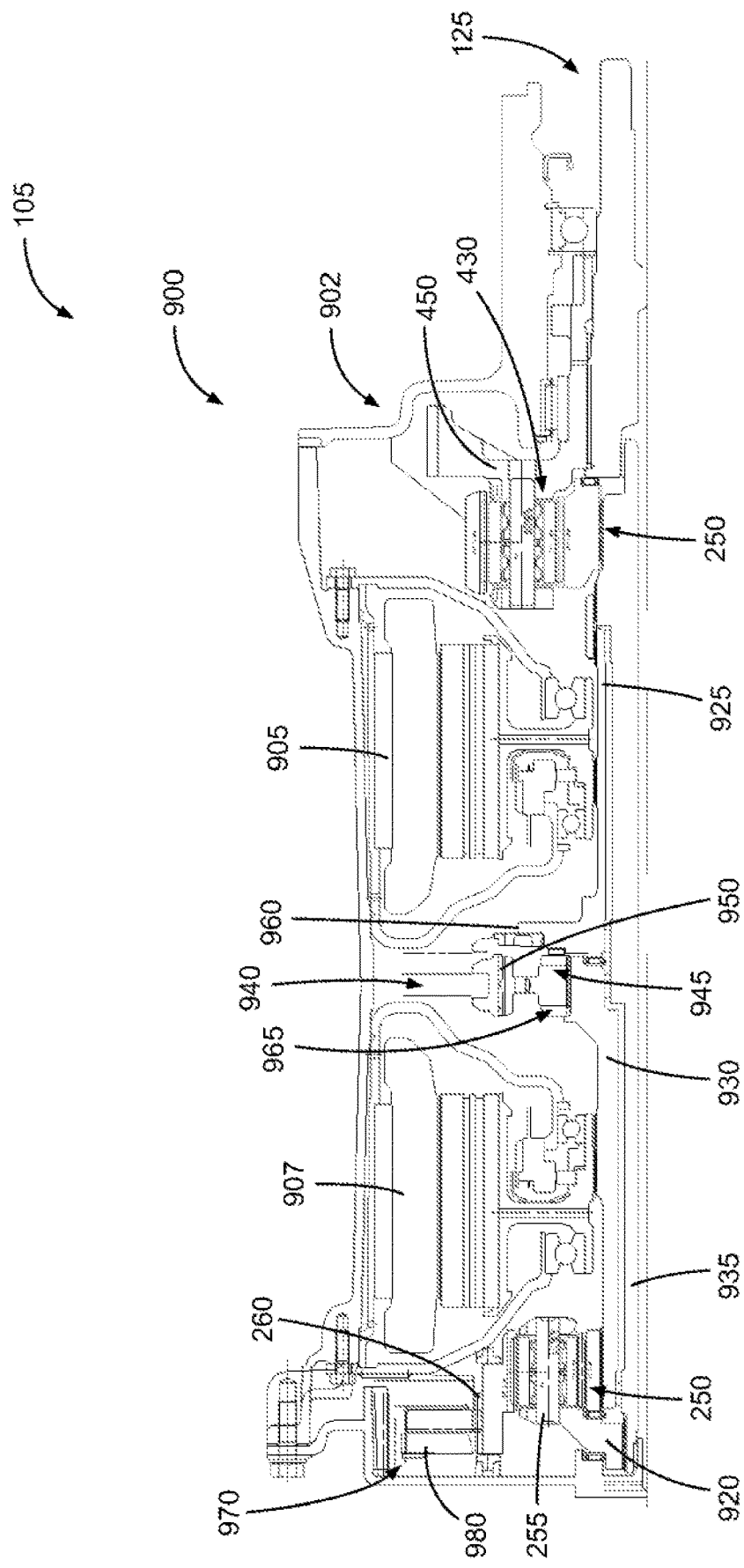
FIG. 10 is a cross-sectional view of the electric powertrain shown in FIG. 9.

FIG. 9 shows a diagram of another example of the electric powertrain 900 that can be used in the vehicle 100 of FIG. 1, and FIG. 10 shows a cross-sectional view of the electric powertrain 900. The electric powertrain 900 shares a number of components and functions in common with the ones described before. For the sake of brevity as well as clarity, these common features will not be described in great detail below, but please refer to the previous discussions of these features.

As depicted, the electric powertrain 900 includes a multiple motor continuous power transmission 902. The transmission 902 of the electric powertrain 900 includes a first electric motor 905 with a first inverter 906 and a second electric motor 907 with a second inverter 908. The first inverter 906 is electrically connected between the ESS 115 and the first electric motor 905, and the second inverter 908 is electrically connected between the ESS 115 and the second electric motor 907. The first inverter 906 and second inverter 908 convert the direct current (DC) from the ESS 115 to alternating current (AC) in order to power the first electric motor 905 and second electric motor 907, respectively. The first electric motor 905 and second electric motor 907 can also act as generators such as during regenerative braking. In such a situation, the first inverter 906 and second inverter 908 convert the AC electrical power from the first electric motor 905 and second electric motor 907, respectively, to DC power that is supplied to the ESS 115. In one example, the first electric motor 905 and second electric motor 907 are the same type of electric motor such that both motors generally provide the same speed and torque output within normal manufacturing tolerances. The first electric motor 905 and second electric motor 907 in one form are interchangeable with one another. The first electric motor 905 and second electric motor 907 in one form are both high speed electric motors. In one specific example, the first electric motor 905 and second electric motor 907 are the same type of high speed electric motor having rated speeds of at least 5,000 rpm, and more particularly, the first electric motor 905 and second electric motor 907 each has a rated speed of at least 10,600 rpm, a rated peak power of at least 250 hp, a rated continuous power of at least 150 hp, a rated continuous torque of at least 240 lb-ft, and a rated peak torque of at least 310 lb-ft.

As can be seen in FIGS. 9 and 10, the electric powertrain 900 includes a first gear train 909 and a second gear train 910. The first gear train 909 is located at the output end of the first electric motor 905 and is proximal to the drive shaft 125. The first gear train 909 includes the first planetary gear 430 with the sun gear 250. Located opposite the second electric motor 907, on the other side of the drive shaft 125 is the second gear train 910. The second gear train 910 includes a second planetary gear 915 with a second carrier 920.

In the illustrated example, the transmission 902 includes a first output shaft 925, a second output shaft 930, and a third output shaft 935 that extend in a longitudinal direction in the electric powertrain 900. The first output shaft 925 and second output shaft 930 are hollow so as to receive the third output shaft 935. The third output shaft 935 extends in a concentric manner inside the first output shaft 925 and second output shaft 930. The second gear train 910 and second planetary gear 915 in one example are respectively secured to the first output shaft 925 and second output shaft 930 via a spline type connection of the types described before.

As shown, the first output shaft 925 and third output shaft 935 are directly connected to the sun gear 250 of the first planetary gear 430. The second output shaft 930 has an interruptible connection with the first output shaft 925 through a first clutch 940 that selectively connects the second output shaft 930 to the first output shaft 925. To provide a compact design, the first clutch 940 is located or sandwiched in between the first electric motor 905 and second electric motor 907. In the illustrated example, the first clutch 940 includes a single position type dog clutch 945, but other types of clutches can be used in other variations. The dog clutch 945 includes a clutch collar 950 and a clutch actuator 955 that is configured to move the clutch collar 950 in a longitudinal direction to engage and disengage the second output shaft 930 from the first output shaft 925. The clutch actuator 955 of the first clutch 940 is operatively connected to the controller 110 so that the controller 110 is able to control the first clutch 940. In the depicted example, the first output shaft 925 has a clutch engagement member 960 and the second output shaft 930 has a range member 965, and the clutch collar 950 of the dog clutch 945 selectively engages and disengages the range member 965 of the second output shaft 930 from the clutch engagement member 960 of the first output shaft 925. In other words, the first output shaft 925 and second output shaft 930 form an interruptible split shaft design that can be selectively connected together so that the torque from the second gear train 910 and second planetary gear 915 can be combined together.

At the end opposite the range member 965, the second output shaft 930 is connected to the second planetary gear 915. Like in the other examples, the second planetary gear 915 includes the sun gear 250, one or more planet gears 255, and the ring gear 260 generally arranged in a concentric manner relative to one another. The second output shaft 930 in the depicted example is connected to the second planetary gear 915 at the sun gear 250. The second planetary gear 915 is in turn connected to the third output shaft 935 through the second carrier 920. Through the second carrier 920, the second planetary gear 915 is able to provide torque to the first output shaft 925 which in turn is provided to the sun gear 250 of the first gear train 909.

The transmission 902 further includes a second clutch 970 that engages the second planetary gear 915. In the illustrated example, the second clutch 970 includes a Selectable One-Way Clutch ("SOWC") 975. The SOWC 975 includes a clutch engagement member 980 configured to engage the ring gear 260 of the second planetary gear 915 and a clutch actuator 985 that selectively engages the clutch engagement member 980 with the ring gear 260 to change the gear ratio for the power supplied by the second planetary gear 915 or disconnects the second electric motor 907. The clutch actuator 985 of the SOWC 975 is operatively connected to the controller 110 so that the controller 110 is able to control the second clutch 970. By controlling the operation of the first clutch 940 and second clutch 970, the controller 110 is able to change and control the speed and torque supplied by the second planetary gear 915 to first gear train 909. In one form, the first clutch 940 and the second clutch 970 work together to attain the first range position. To attain the first range position, the SOWC 975 is engaged to the ring gear 260 by actuation of the clutch actuator 985. At this time, the first clutch 940 is disengaged from the clutch engagement member 960 so that the first output shaft 925 and the second output shaft 930 are disconnected. To attain the second range positon, the SOWC 975 is disengaged from the ring gear 260 by actuation of the clutch actuator 985. This allows the ring gear 260 to freewheel. At this time, the first clutch 940 is actuated by the clutch actuator 955 to engage with the clutch engagement member 960. This connects the first output shaft 925 and the second output shaft 930.

As should be recognized, the second gear train 910 in FIG. 9 operates in a similar fashion to the first planetary gear 725 in FIG. 7. When the clutch engagement member 980 of the SOWC 975 engages the ring gear 260, the second gear train 910 reduces the speed and increases the torque supplied to the third output shaft 935 from the second electric motor 907. When the clutch engagement member 980 is disengaged from the ring gear 260, no torque is provided via the second gear train 910. To provide torque from the second electric motor 907, the controller 110 via the dog clutch 945 connects the range member 965 of the second output shaft 930 to the clutch engagement member 960 of the first output shaft 925. In these as well as other operational scenarios, the first gear train 909 reduces the speed of the output provided by the first electric motor 905 and/or second electric motor 907 which are high speed motors.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Aftermarket Product" generally refers to one or more parts and/or accessories used in repair and/or enhancement of a product already made and sold by an Original Equipment Manufacturer (OEM). For example, aftermarket products can include spare parts, accessories, and/or components for motor vehicles.

"Axis" generally refers to a straight line about which a body, object, and/or a geometric figure rotates or may be conceived to rotate.

"Bearing" generally refers to a machine element that constrains relative motion and reduces friction between moving parts to only the desired motion, such as a rotational movement. The bearing for example can be in the form of loose ball bearings found in a cup and cone style hub. The bearing can also be in the form of a cartridge bearing where ball bearings are contained in a cartridge that is shaped like a hollow cylinder where the inner surface rotates with respect to the outer surface by the use of ball or other types of bearings.

"Brake" generally refers to a device for arresting and/or preventing the motion of a mechanism usually via friction, electromagnetic, and/or other forces. Brakes for example can include equipment in automobiles, bicycles, or other vehicles that are used to slow down and/or stop the vehicle. In other words, a brake is a mechanical device that inhibits motion by absorbing energy from a moving system. The brake can be for example used for slowing or stopping a moving vehicle, wheel, and/or axle, or to prevent its motion. Most often, this is accomplished by friction. Types of brakes include frictional, pressure, and/or electromagnetic type braking systems. Frictional brakes for instance can include caliper, drum, and/or disc drakes. Electromagnetic braking systems for example can include electrical motor/generators found in regenerative braking systems.

"Clutch" generally refers to a device that engages and disengages mechanical power transmission between two or more rotating shafts or other moving components. In one example, one shaft is typically attached to an engine, motor, or other power source, which acts as the driving member, while the other shaft (i.e., the driven member) provides output power for work. While the motions involved are usually rotary motions, linear clutches are also used to engage and disengage components moving with a linear or near linear motion. The clutch components can for instance be engaged and disengaged through mechanical, hydraulic, and/or electrical actuation. The clutches can include positive type clutches and friction type clutches. Wet type clutches are typically immersed in a cooling lubrication liquid or other fluid, and dry clutches are not bathed in such liquids. Some non-limiting examples of clutches include cone clutches, centrifugal clutches, torque limiter clutches, axial clutches, disc clutches, dog clutches, and rim clutches, to name just a few.

"Controller" generally refers to a device, using mechanical, hydraulic, pneumatic electronic techniques, and/or a microprocessor or computer, which monitors and physically alters the operating conditions of a given dynamical system. In one non-limiting example, the controller can include an Allen Bradley brand Programmable Logic Controller (PLC). A controller may include a processor for performing calculations to process input or output. A controller may include a memory for storing values to be processed by the processor or for storing the results of previous processing. A controller may also be configured to accept input and output from a wide array of input and output devices for receiving or sending values. Such devices include other computers, keyboards, mice, visual displays, printers, industrial equipment, and systems or machinery of all types and sizes. For example, a controller can control a network or network interface to perform various network communications upon request. The network interface may be part of the controller, or characterized as separate and remote from the controller. A controller may be a single, physical, computing device such as a desktop computer or a laptop computer, or may be composed of multiple devices of the same type such as a group of servers operating as one device in a networked cluster, or a heterogeneous combination of different computing devices operating as one controller and linked together by a communication network. The communication network connected to the controller may also be connected to a wider network such as the Internet. Thus a controller may include one or more physical processors or other computing devices or circuitry and may also include any suitable type of memory. A controller may also be a virtual computing platform having an unknown or fluctuating number of physical processors and memories or memory devices. A controller may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Controller Area Network" or "CAN" generally refers to a vehicle bus standard designed to allow microcontrollers, sensors, and/or other devices to communicate with each other in applications without necessarily a host computer. CAN systems include a message-based protocol, designed originally for multiplex electrical wiring within automobiles, but is also used in many other contexts. A vehicle with a CAN system may normally, but not always, includes multiple Electronic Control Units (ECUs) which can be also called nodes. These ECUs can include Engine Control Modules (ECMs) and Transmission Control Modules (TCMs) as well as other control units such as for airbags, antilock braking/ABS, cruise control, electric power steering, audio systems, power windows, doors, mirror adjustment, battery and/or hybrid/electric recharging systems, to name just a few. A CAN includes a multi-master serial bus standard for connecting ECUs. The complexity of the ECU or node can range from a simple Input/Output (I/O) device up to an embedded computer with a CAN interface and software. The ECU or node can also act as a gateway allowing a general purpose computer to communicate over an interface, such as via a USB and/or Ethernet port, to the devices on the CAN network. Each ECU usually, but not always, includes a central processing unit, a CAN controller, and transceiver. The CAN systems can for example include low speed CAN (128 Kbps) under the ISO 11898-3 standard, high speed CAN (512 Kbps) under the ISO 11898-2 standard, CAN FD under the ISO 11898-1 standard, and single wire CAN under the SAE J2411 standard.

"Couple" or "Coupled" generally refers to an indirect and/or direct connection between the identified elements, components, and/or objects. Often the manner of the coupling will be related specifically to the manner in which the two coupled elements interact.

"Dog Clutch" generally refers to a type of positive clutch that couples and decouples at least two rotating shafts or other rotating mechanical components by an interference type connection. The two parts of the clutch are designed such that one will push the other, thereby causing both to rotate at the same speed with no (or very minimal) slippage. Typically, but not always, one part of the dog clutch includes a series of teeth or other protrusions that are configured to mate with another part of the dog clutch that includes corresponding recesses for receiving the teeth or protrusions. Unlike friction clutches that allow slippage, dog clutches are used where slip is undesirable and/or the clutch is not used to control torque. Without slippage, dog clutches are not affected by wear in the same manner as friction clutches.

"Electric Motor" generally refers to an electrical machine that converts electrical energy into mechanical energy. Normally, but not always, electric motors operate through the interaction between one or more magnetic fields in the motor and winding currents to generate force in the form of rotation. Electric motors can be powered by direct current (DC) sources, such as from batteries, motor vehicles, and/or rectifiers, or by alternating current (AC) sources, such as a power grid, inverters, and/or electrical generators. An electric generator can (but not always) be mechanically identical to an electric motor, but operate in the reverse direction, accepting mechanical energy and converting the mechanical energy into electrical energy.

"Energy Storage System" (ESS) or "Energy Storage Unit" generally refers to a device that captures energy produced at one time for use at a later time. The energy can be supplied to the ESS in one or more forms, for example including radiation, chemical, gravitational potential, electrical potential, electricity, elevated temperature, latent heat, and kinetic types of energy. The ESS converts the energy from forms that are difficult to store to more conveniently and/or economically storable forms. By way of non-limiting examples, techniques for accumulating the energy in the ESS can include: mechanical capturing techniques, such as compressed air storage, flywheels, gravitational potential energy devices, springs, and hydraulic accumulators; electrical and/or electromagnetic capturing techniques, such as using capacitors, super capacitors, and superconducting magnetic energy storage coils; biological techniques, such as using glycogen, biofuel, and starch storage mediums; electrochemical capturing techniques, such as using flow batteries, rechargeable batteries, and ultra batteries; thermal capture techniques, such as using eutectic systems, molten salt storage, phase-change materials, and steam accumulators; and/or chemical capture techniques, such as using hydrated salts, hydrogen, and hydrogen peroxide. Common ESS examples include lithium-ion batteries and super capacitors.

"Fastener" generally refers to a hardware device that mechanically joins or otherwise affixes two or more objects together. By way of nonlimiting examples, the fastener can include bolts, dowels, nails, nuts, pegs, pins, rivets, screws, and snap fasteners, to just name a few.

"Gear Train" generally refers to a system of gears that transmit power from one mechanical component to another. For example, a gear train can include a combination of two or more gears, mounted on rotating shafts, to transmit torque and/or power. As one non-limiting example, the gear train for instance can include a planetary gearset.

"High Speed Motor" generally refers to a motor that has a rated operating speed of at least 5,000 rpm (revolutions per minute) without the use of gear trains or other similar equipment for changing speed.

"Interchangeable" generally refers to two or more things that are capable of being put and/or used in place of each other. In other words, one thing is capable of replacing and/or changing places with something else. For example, interchangeable parts typically, but not always, are manufactured to have nearly the same structural size as well as shape within normal manufacturing tolerances and have nearly the same operational characteristics so that one part can be replaced by another interchangeable part. In some cases, the interchangeable parts can be manufactured and/or sold by a specific company under the same part or Stock Keeping Unit (SKU) identifier, and in other cases, different companies can manufacture and/or sell the same interchangeable parts.

"Interruptible Connection" generally refers to a mechanical linkage between two mechanical components that has the ability to break continuity during normal operation such that the components can be mechanically disconnected and reconnected if so desired. When disconnected, the components are unable to provide mechanical power to one another. The interruptible connection can include multiple components such as multiple shafts and gears that engage with one another. The interruptible connection includes at least one mechanism, such as a clutch, that is designed to disconnect and reconnect the mechanical linkage between the components during normal operation.

"Inverter" or "Power Inverter" generally refers to an electronic device and/or circuitry that at least converts direct current (DC) to alternating current (AC). Certain types of inverters can further include a rectifier that converts AC to DC such that the inverter and rectifier functions are combined together to form a single unit that is sometimes referred to as an inverter. The inverter can be entirely electronic or may be a combination of mechanical devices, like a rotary apparatus, and electronic circuitry. The inverter can further include static type inverters that do not use moving parts to convert DC to AC.

"Lateral" generally refers to being situated on, directed toward, or coming from the side. "Longitudinal" generally relates to length or lengthwise dimension of an object, rather than across.

"Low Speed Motor" generally refers to a motor that has a rated operating speed of less than 5,000 rpm (revolutions per minute) without the use of gear trains or other similar equipment for changing speed.

"Motor" generally refers to a machine that supplies motive power for a device with moving parts. The motor can include rotor and linear type motors. The motor can be powered in any number of ways, such as via electricity, internal combustion, pneumatics, and/or hydraulic power sources. By way of non-limiting examples, the motor can include a servomotor, a pneumatic motor, a hydraulic motor, a steam engine, pneumatic piston, hydraulic piston, and/or an internal combustion engine.

"Original Equipment Manufacturer" or "OEM" generally refers to an organization that makes finished devices from component parts bought from other organizations that are usually sold under their own brand in a consumer or commercial market.

"Planetary Gear" or "Planetary Gearset" generally refers to a system of at least two gears mounted so that the center of at least one gear revolves around the center of the other. In other words, the planetary gear includes a system of epicyclic gears in which at least one gear axis revolves about the axis of another gear. In one example, a carrier connects the centers of the two gears and rotates to carry one gear, which is called a planet gear, around the other, which is commonly called a sun gear. Typically, but not always, the planet and sun gears mesh so that their pitch circles roll without slip. A point on the pitch circle of the planet gear normally traces an epicycloid curve. In one simplified case, the sun gear is fixed and the one or more planet gears roll around the sun gear. In other examples, an epicyclic gear train can be assembled so the planet gear rolls on the inside of the pitch circle of a fixed, outer gear ring, or ring gear, that is sometimes called an annular gear. In this case, the curve traced by a point on the pitch circle of the planet gear is a hypocycloid. A planetary gear is typically used to transfer large torque loads in a compact form.

"Positive Clutch" generally refers to a type of clutch that is designed to transmit torque without slippage such as through a mechanical interference type connection. Some examples of positive clutches include jaw clutches (e.g., square or spiral jaw clutches) and dog clutches.

"Powertrain" generally refers to devices and/or systems used to transform stored energy into kinetic energy for propulsion purposes. The powertrain can include multiple power sources and can be used in non-wheel-based vehicles. By way of non-limiting examples, the stored energy sources can include chemical, solar, nuclear, electrical, electrochemical, kinetic, and/or other potential energy sources. For example, the powertrain in a motor vehicle includes the devices that generate power and deliver the power to the road surface, water, and/or air. These devices in the powertrain include engines, motors, transmissions, drive shafts, differentials, and/or final drive components (e.g., drive wheels, continuous tracks, propeller, thrusters, etc.).

"Rated Continuous Power" or "Continuous Rated Power" generally refer to an amount of energy or work provided per unit of time (i.e., power) an electric motor will produce without interruption for a rated speed, at a rated torque, and at a rated voltage for the electric motor. In other words, the rated continuous power is usually the power that the electric motor can produce for a long period of time at the rated speed and the rated torque without damaging the electric motor.

"Rated Operating Speed" or "Rated Speed" generally refers to a velocity (i.e., speed) an electric motor will rotate when producing a rated continuous power at a supplied rated voltage for the electric motor. Typically, but not always, the rated operating speed is measured in terms of Revolutions Per Minute (rpm). Generally speaking, the rated operating speed is the prescribed rpm at which the motor operates, keeping the mechanical stability and efficiency of the electric motor in mind. The rated voltage and rated horsepower respectively refer to the maximum voltage and horsepower (hp) where the motor can operate efficiently without being damaged. The value for the rated operating speed will be slightly less than a synchronous speed of the electric motor due to a decrease in speed caused by adding a load (i.e., slip or speed loss). For instance, most alternating current (AC) induction motors with synchronous speeds of 1800 RPM will have normally have rated speeds ranging between about 1720 and about 1770 RPM depending on the amount of slip. Some newer high or energy-efficient electric motors will tend to have rated operating speeds towards a higher end of the range.

"Rated Continuous Torque" or "Continuous Rated Torque" generally refer to a magnitude of twisting force, or torque, an electric motor will produce without interruption for a rated speed and at a rated voltage for the electric motor. In other words, the rated continuous torque is usually a torque that the electric motor can output for a long period of time at the rated speed without damaging the electric motor. Typically, this value is generated close to the maximum speed of the motor.

"Rectifier" generally refers to an electronic device and/or circuitry that at least converts alternating current (AC) to direct current (DC). Some types of rectifiers include single-phase and three-phase rectifiers as well as those that perform half-wave and/or full-wave rectification.

"Resolver" generally refers to a type of rotary sensor for measuring the degree of rotation, velocity, and/or acceleration of a rotary type device. In one example, the resolver includes a rotary electrical transformer used for measuring degrees of rotation such as in an electric motor, an electric generator, and/or a transmission. The resolver can include analog or digital type electrical devices. The resolver can be in the form of a two-pole type resolver or a multi-pole type resolver. Some other types of resolvers include receiver type resolvers and differential type resolvers.

"Rotor" generally refers to a part or portion in a machine that rotates in or around a stationary part, which is commonly referred to as a stator. The rotor is the moving or rotating part of a rotary system, such as found in electric generators, electric motors, sirens, mud motors, turbines, and/or biological rotors. In one particular non-limiting example, the rotor includes the rotating portion of an electric generator and/or motor, especially of an induction motor.

"Selectable One-Way Clutch" (SOWC) generally refers to a type of clutch that is able to be controlled to lock in at least one rotational direction. One-way clutches are usually (but not always) designed to transfer torque or lock when rotated in one direction and to allow rotational movement or free-wheel when rotated in the opposite direction. The SOWC is a type of one-way clutch that can be used to control when and/or in which direction the rotational motion is locked or able to rotate freely. By way of a non-limiting example, the SOWC can be activated to lock so as to transfer torque when torque is applied in one rotational direction and facilitate free-wheel or slipping movement in the opposite rotational direction. In other variations, the SOWC can be controlled at times to facilitate free-wheel motion in both rotational directions or locked to allow torque transfer in both rotational directions. Alternatively or additionally, the SOWC can be controlled to switch or change the locked and free-wheel rotational directions. For example, the SOWC under one operating condition can be locked when rotated in a counterclockwise and free-wheel spin in the clockwise direction, and under other conditions, the SOWC can be switched so that the SOWC is locked in the clockwise direction and free-wheel spin in the counterclockwise direction. Some non-limiting examples of SOWC designs include roller, sprag, spiral, and mechanical diode type designs. The SOWC can be controlled or actuated in a number of ways such as through mechanical and/or electrical actuation. For instance, the SOWC can be actuated with hydraulic, pneumatic, and/or electrical type actuators to name just a few.

"Sensor" generally refers to an object whose purpose is to detect events and/or changes in the environment of the sensor, and then provide a corresponding output. Sensors include transducers that provide various types of output, such as electrical and/or optical signals. By way of nonlimiting examples, the sensors can include pressure sensors, ultrasonic sensors, humidity sensors, gas sensors, motion sensors, acceleration sensors, displacement sensors, force sensors, optical sensors, and/or electromagnetic sensors. In some examples, the sensors include barcode readers, RFID readers, and/or vision systems.

"Stator" generally refers to a stationary part or portion in a machine in or about which a rotating part revolves, which is commonly referred to as a rotor. The stator is the stationary part of a rotary system, such as found in electric generators, electric motors, sirens, mud motors, turbines, and/or biological rotors. In one particular non-limiting example, the stator includes the stationary portion of an electric generator and/or motor, especially of an induction motor.

"Stock Keeping Unit" (SKU) generally refers to a distinct type of item for sale, manufacture, and/or inventory, such as a specific product and/or service, and all attributes associated with the item type that distinguish the item from other item types. For example, these attributes for a product can include the manufacturer, description, material, size, color, packaging, and/or warranty terms. Businesses typically track the quantity for each SKU the company has in inventory. The SKU can also refer to a unique identifier and/or other code that refers to the particular item type. These codes are usually not regulated and/or standardized.

"Substantially" generally refers to the degree by which a quantitative representation may vary from a stated reference without resulting in an essential change of the basic function of the subject matter at issue. The term "substantially" is utilized herein to represent the inherent degree of uncertainty that may be attributed to any quantitative comparison, value, measurement, and/or other representation.

"Symmetric" or "Symmetrical" generally refers to a property of something having two sides or halves that are the same relative to one another, such as in shape, size, and/or style. In other words, symmetric describes something as having a minor-image quality.

"Synchronizer" or "Synchronizer Mechanism" ("Synchromesh") generally refer to a device that includes a cone clutch and a blocking ring which brings the speeds of a gear and a gear selector to the same speed using friction. In one example, before the teeth of the gear and gear selector can engage, the cone clutch engages first which in turn brings the gear selector and gear to the same speed using friction. Until synchronization occurs, the teeth of the gear and the gear selector are prevented from making contact by the blocking ring. When synchronization occurs, the friction on the blocking ring is relieved and the blocking ring twists slightly. With this twisting motion, grooves or notches are aligned that allow further passage of the gear selector which brings the teeth together.

"Transmission" generally refers to a power system that provides controlled application of mechanical power. The transmission uses gears and/or gear trains to provide speed, direction, and/or torque conversions from a rotating power source to another device.

"Transverse" generally refers to things, axes, straight lines, planes, or geometric shapes extending in a non-parallel and/or crosswise manner relative to one another. For example, when in a transverse arrangement, lines can extend at right angles or perpendicular relative to one another, but the lines can extend at other non-straight angles as well such as at acute, obtuse, or reflex angles. For instance, transverse lines can also form angles greater than zero (0) degrees such that the lines are not parallel. When extending in a transverse manner, the lines or other things do not necessarily have to intersect one another, but they can.

"Uninterrupted Connection" generally refers to a mechanical linkage between two mechanical components without any break in continuity such that mechanical force can be transmitted on a continuous basis if so desired. The uninterrupted connection does not require a unitary connection such that the uninterrupted connection can include multiple components such as multiple shafts and gears that engage with one another. The uninterrupted connection lacks mechanisms or other structures, such as clutches, that are designed to disconnect and reconnect the mechanical linkage between the components during normal operation. It should be recognized that the uninterrupted connection can occasionally have accidental breakages that disconnect the components, but the design of the uninterrupted connection is not designed to facilitate such breakages and resulting disconnections.

"Vehicle" generally refers to a machine that transports people and/or cargo. Common vehicle types can include land based vehicles, amphibious vehicles, watercraft, aircraft, and space craft. By way of non-limiting examples, land based vehicles can include wagons, carts, scooters, bicycles, motorcycles, automobiles, buses, trucks, semitrailers, trains, trolleys, and trams. Amphibious vehicles can for example include hovercraft and duck boats, and watercraft can include ships, boats, and submarines, to name just a few examples. Common forms of aircraft include airplanes, helicopters, autogiros, and balloons, and spacecraft for instance can include rockets and rocket-powered aircraft. The vehicle can have numerous types of power sources. For instance, the vehicle can be powered via human propulsion, electrically powered, powered via chemical combustion, nuclear powered, and/or solar powered. The direction, velocity, and operation of the vehicle can be human controlled, autonomously controlled, and/or semi-autonomously controlled. Examples of autonomously or semi-autonomously controlled vehicles include Automated Guided Vehicles (AGVs) and drones.

The term "or" is inclusive, meaning "and/or".

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

| Reference Numbers | |
|---|---|
| 100 | vehicle |
| 105 | powertrain system |
| 110 | controller |
| 115 | ESS |
| 120 | CAN |
| 125 | drive shaft |
| 130 | propulsion system |
| 135 | wheels |
| 140 | power cables |
| 200 | electric powertrain |
| 205 | transmission |
| 210 | first electric motor |
| 215 | second electric motor |
| 220 | first gear train |
| 225 | second gear train |
| 230 | first planetary gear |
| 235 | second planetary gear |
| 240 | first output shaft |

| Reference Numbers | |
|---|---|
| 245 | second output shaft |
| 250 | sun gear |
| 255 | planet gears |
| 260 | ring gear |
| 265 | housing |
| 270 | first carrier |
| 275 | second carrier |
| 280 | clutch |
| 285 | clutch engagement member |
| 290 | first range member |
| 295 | second range member |
| 300 | electric motor transmission |
| 305 | longitudinal axis |
| 310 | rotor |
| 315 | stator |
| 320 | positive clutch |
| 325 | dog clutch |
| 330 | clutch actuator |
| 400 | electric powertrain |
| 405 | transmission |
| 410 | first electric motor |
| 412 | first inverter |
| 415 | second electric motor |
| 417 | second inverter |
| 420 | first gear train |
| 425 | second gear train |
| 430 | first planetary gear |
| 435 | second planetary gear |
| 440 | first output shaft |
| 445 | second output shaft |
| 450 | first carrier |
| 455 | second carrier |
| 460 | clutch |
| 461 | dog clutch |
| 462 | clutch actuator |
| 465 | clutch engagement member |
| 470 | first range member |
| 475 | second range member |
| 600 | electric powertrain |
| 605 | transmission |
| 610 | first electric motor |
| 612 | first inverter |
| 615 | second electric motor |
| 617 | second inverter |
| 700 | electric powertrain |
| 705 | transmission |
| 710 | first electric motor |
| 712 | first inverter |
| 715 | second electric motor |
| 717 | second inverter |
| 720 | first gear train |
| 725 | first planetary gear |
| 730 | sun gear |
| 735 | planet gears |
| 740 | ring gear |
| 745 | first carrier |
| 750 | first output shaft |
| 755 | SOWC |
| 760 | clutch engagement member |
| 765 | clutch actuator |
| 800 | electric powertrain |
| 805 | transmission |
| 810 | first electric motor |
| 812 | first inverter |
| 815 | second electric motor |
| 817 | second inverter |
| 820 | speed reduction gear train |
| 825 | first planetary gear |
| 830 | sun gear |
| 835 | planet gears |
| 840 | ring gear |
| 845 | carrier |
| 850 | first output shaft |
| 900 | electric powertrain |
| 902 | transmission |
| 905 | first electric motor |
| 906 | first inverter |
| 907 | second electric motor |
| 908 | second inverter |
| 909 | first gear train |
| 910 | second gear train |
| 915 | second planetary gear |
| 920 | second carrier |
| 925 | first output shaft |
| 930 | second output shaft |
| 935 | third output shaft |
| 940 | first clutch |
| 945 | dog clutch |
| 950 | clutch collar |
| 955 | clutch actuator |
| 960 | clutch engagement member |
| 965 | range member |
| 970 | second clutch |
| 975 | SOWC |
| 980 | clutch engagement member |
| 985 | clutch actuator |

What is claimed is:

1. A powertrain system, comprising:
an output;
a first electric motor with an uninterrupted connection to the output;
a second electric motor with an interruptible connection to the output;
wherein the first and second electric motors are different types;
wherein the first electric motor is located upstream relative to the second electric motor;
a first gear train coupled to the first electric motor at an end opposite the output;
wherein the first gear train includes a first planetary gear;
wherein the first planetary gear includes a sun gear, a ring gear surrounding the sun gear, and one or more planet gears engaged between the sun gear and the ring gear;
wherein the sun gear is attached to the first electric motor;
a selectable one-way clutch (SOWC) including a clutch engagement member and an actuator configured to selectively engage and disengage the clutch engagement member with the ring gear;
a first output shaft connecting the first planetary gears to the output;
a second gear train coupled to the second electric motor;
wherein the second gear train includes a second planetary gear and a clutch configured to engage the first output shaft; and
wherein the first electric motor and the second electric motor are sandwiched between the first gear train and the second gear train.

2. The powertrain system of claim 1, wherein the second electric motor has a rated continuous torque that is greater than the first electric motor.

3. The powertrain system of claim 1, wherein the first electric motor has a rated continuous power that is greater than the second electric motor.

4. The powertrain system of claim 1, wherein the clutch includes a positive clutch.

5. The powertrain system of claim 1, wherein the first electric motor has a rated continuous torque that is lower than the second electric motor.

6. A powertrain system, comprising:
an output;
a first electric motor with an uninterrupted connection to the output;

a second electric motor with an interruptible connection to the output;
wherein the second electric motor has a rated continuous torque that is greater than the first electric motor;
wherein the second electric motor has a rated continuous power that is greater than the first electric motor;
a first gear train coupled to the first electric motor;
wherein the first gear train includes a first planetary gear;
wherein the first planetary gear includes a sun gear, a ring gear surrounding the sun gear, and one or more planet gears engaged between the sun gear and the ring gear;
wherein the sun gear is attached to the first electric motor;
a first output shaft connecting the first planetary gears to the output;
a second gear train coupled to the second electric motor;
wherein the second gear train includes a second planetary gear and a clutch configured to engage the first output shaft; and
a selectable one-way clutch (SOWC) including a clutch engagement member and an actuator configured to selectively engage and disengage the clutch engagement member with the ring gear.

7. The powertrain system of claim 6, wherein the first electric motor is a high speed motor and the second electric motor is a low speed motor.

8. A powertrain system, comprising:
an output;
a first electric motor with an uninterrupted connection to the output;
a second electric motor with an interruptible connection to the output;
wherein the first and second electric motors are different types;
wherein the first electric motor is located upstream relative to the second electric motor;
wherein the first electric motor is a low speed motor and the second electric motor is a high speed motor;
a first output shaft secured to the first electric motor;
wherein the first output shaft has a clutch engagement member;
a second output shaft secured to the second electric motor;
a speed reduction gear train directly connected to an output end of the second electric motor to increase torque supplied from the second electric motor;
wherein the speed reduction gear train includes a first planetary gear;
wherein the first planetary gear has a sun gear attached to the second output shaft, a ring gear, and one or more planet gears engaged between the sun gear and the ring gear;
a second gear train including a clutch and a second planetary gear;
wherein the second planetary gear has a first range member and a second range member;
wherein the clutch is configured to selectively engage the first range member, the second range member, and the clutch engagement member;
wherein the speed reduction gear train is sandwiched between the second electric motor and the second gear train;
wherein the first output shaft extends in a longitudinal direction through the first electric motor and the second electric motor; and
wherein the first output shaft extends in a concentric manner within the second output shaft.

9. The powertrain system of claim 8, wherein the first electric motor has a rated continuous power that is greater than the second electric motor.

* * * * *